(12) United States Patent
Douceur et al.

(10) Patent No.: US 7,047,420 B2
(45) Date of Patent: May 16, 2006

(54) EXCLUSIVE ENCRYPTION

(75) Inventors: John R. Douceur, Bellevue, WA (US); Josh D. Benaloh, Redmond, WA (US); Gideon A. Yuval, Mercer Island, WA (US); Atul Adya, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 840 days.

(21) Appl. No.: 09/764,962

(22) Filed: Jan. 17, 2001

(65) Prior Publication Data

US 2002/0095590 A1   Jul. 18, 2002

(51) Int. Cl.
  G06F 11/30   (2006.01)
  G06F 12/14   (2006.01)
  G06F 1/26    (2006.01)
  G06F 1/28    (2006.01)
  H04L 9/32    (2006.01)

(52) U.S. Cl. ..................................... 713/190; 707/100
(58) Field of Classification Search ........ 707/204–206, 707/100; 713/152, 165, 190; 717/142–144, 717/110–112, 151
See application file for complete search history.

(56) References Cited

U.S. PATENT DOCUMENTS

| | | | |
|---|---|---|---|
| 5,317,728 A | 5/1994 | Tevis et al. | |
| 5,371,794 A | 12/1994 | Diffie et al. | |
| 5,452,447 A | 9/1995 | Nelson et al. | |
| 5,588,147 A | 12/1996 | Neeman et al. | |
| 5,778,395 A | 7/1998 | Whiting et al. | |
| 5,812,776 A | 9/1998 | Gifford | |
| 5,873,085 A | 2/1999 | Enoki et al. | |
| 5,901,227 A | 5/1999 | Perlman | |
| 5,907,673 A | 5/1999 | Hirayama et al. | |
| 5,909,540 A | 6/1999 | Carter et al. | |
| 5,915,096 A | 6/1999 | Rosenzweig et al. | |
| 5,950,198 A | 9/1999 | Falls et al. | |
| 5,991,414 A | 11/1999 | Garay et al. | |
| 5,991,771 A | 11/1999 | Falls et al. | |
| 6,026,474 A | 2/2000 | Carter et al. | |
| 6,067,545 A | 5/2000 | Wolff | |
| 6,098,079 A | 8/2000 | Howard | |
| 6,160,552 A | 12/2000 | Wilsher et al. | |
| 6,167,449 A | 12/2000 | Arnold et al. | |
| 6,185,574 B1 | 2/2001 | Howard et al. | |
| 6,208,659 B1 | 3/2001 | Govindarajan et al. | |
| 6,233,606 B1 | 5/2001 | Dujari | ........................ 709/213 |
| 6,263,348 B1 | 7/2001 | Kathrow et al. | |
| 6,295,538 B1 | 9/2001 | Cooper et al. | |
| 6,324,544 B1 | 11/2001 | Alam et al. | |
| 6,345,288 B1 | 2/2002 | Reed et al. | |

(Continued)

OTHER PUBLICATIONS

ISU: http://www.isu.edu/departments/comcom/unix/workshop/shell.html.*

(Continued)

Primary Examiner—Kim Vu
Assistant Examiner—Peter Poltorak
(74) Attorney, Agent, or Firm—Lee & Hayes, PLLC

(57) ABSTRACT

An exclusive encryption system is established using multiple computing devices. The exclusive encryption system allows for the exclusion of certain plaintext (e.g., by one of the computing devices) and ciphertext (e.g., by another of the computing devices) while at the same time maintaining the privacy created by the encryption (e.g., so the other computing device cannot see the plaintext). The exclusive encryption system may be implemented as part of a serverless distributed file system with directory entries (e.g., file names or folder names) being the plaintext, or alternatively as part of other systems.

41 Claims, 13 Drawing Sheets

U.S. PATENT DOCUMENTS

| | | |
|---|---|---|
| 6,370,547 B1 | 4/2002 | Eftink |
| 6,389,433 B1 | 5/2002 | Bolosky et al. |
| 6,405,315 B1 | 6/2002 | Burns et al. |
| 6,415,372 B1 | 7/2002 | Zakai et al. |
| 6,463,535 B1 | 10/2002 | Drews |
| 6,466,978 B1 | 10/2002 | Mukherjee et al. |
| 6,477,544 B1 | 11/2002 | Bolosky et al. |
| 6,484,204 B1 | 11/2002 | Rabinovich |
| 6,493,804 B1 | 12/2002 | Soltis et al. |
| 6,510,426 B1 | 1/2003 | Cohen et al. |
| 6,522,423 B1 | 2/2003 | Cohen et al. |
| 6,535,894 B1 | 3/2003 | Schmidt et al. |
| 6,556,998 B1 | 4/2003 | Mukherjee et al. |
| 6,560,706 B1 | 5/2003 | Carbajal et al. |
| 6,577,734 B1 | 6/2003 | Etzel et al. ................. 380/277 |
| 6,671,821 B1 | 12/2003 | Castro et al. |
| 6,704,730 B1 | 3/2004 | Moulton et al. |
| 6,718,360 B1 | 4/2004 | Jones et al. |
| 6,721,880 B1 | 4/2004 | Pike |
| 6,725,373 B1 | 4/2004 | Carbajal et al. |
| 6,738,797 B1 | 5/2004 | Martin |
| 6,742,114 B1 | 5/2004 | Carter et al. |
| 6,748,538 B1 | 6/2004 | Chan et al. |
| 6,766,367 B1 | 7/2004 | Stevenson et al. |
| 6,788,769 B1 | 9/2004 | Waites |
| 2002/0016174 A1 | 2/2002 | Gibson et al. |
| 2002/0073082 A1 | 6/2002 | Duvillier et al. |
| 2002/0088011 A1* | 7/2002 | Lamkin et al. ............. 725/142 |
| 2002/0099784 A1 | 7/2002 | Tran |
| 2002/0103818 A1 | 8/2002 | Amberden |
| 2002/0111996 A1 | 8/2002 | Jones et al. |
| 2003/0046533 A1* | 3/2003 | Olkin et al. ................ 713/152 |
| 2003/0135586 A1 | 7/2003 | Minborg |
| 2004/0068652 A1 | 4/2004 | Carpentier et al. |

OTHER PUBLICATIONS http://www.isu.edu/departments/comcom/unix/workshop/.*
http://web.archive.org/web/*/http://www.isu.edu/departments/comcom/unix/workshop/shell.html.*
E. Adar and B. Huberman, "Free Riding on Gnutella," Xerox PARC Technical Report, pp. 1-22, Aug. 2000.
R. Anderson, "The Eternity Service," PRAGO-CRYPT, pp. 242-252, Oct. 1996.
T. Anderson, M. Dahlin, J. Neefe, D. Patterson, D. Roselli, and R. Wang, "Serverless Network File Systems," 15th Symposium on Operating Systems Principles, pp. 109-126, Dec. 1995.
W. Bolosky, J. Douceur, D. Ely, M. Theimer, "Feasibility of a Serverless Distributed File System Deployed on a Existing Set of Desktop PCs", Proceedings of the International Conference on Measurement and Modeling of Computer Systems, pp. 34-43, Jun. 17-21, 2000.
W. Bolosky, S. Corbin, D. Goebel, and J. Douceur, "Single Instance Storage in Windows® 2000," Proceedings of the 4th USENIX Windows Systems Symposium, pp. 13-24, Aug. 2000.
G. Cabri, A. Corradi, F. Zambonelli, "Experience of Adaptive Replication in Distributed File Systems", 22nd IEEE EUROMICRO, 10 pages, Sep. 1996.
M. Castro and B. Liskov, "Practical Byzantine Fault Tolerance," Proceedings of the Third Symposium on Operating Systems Design and Implementation, 14 pages, Feb. 1999.
M. Castro and B.Liskov, "Proactive Recovery in a Byzantine-Fault-Tolerant System," 4th Symposium on Operating Systems Design and Implementation, pp. 273-287, Oct. 2000.
I. Clarke, O. Sandberg, B. Wiley, and T. Hong, "Freenet: A Distributed Anonymous Information Storage and Retrieval System," ICSI Workshop on Design Issues in Anonymity and Unobservability, 21 pages, Jul. 2000.
J. Douceur and W. Bolosky, "A Large-Scale Study of File-System Contents," SIGMETRICS, pp. 59-70, May 1999.
L. Fan, P. Cao, J. Almeida, and A. Broder, "Summary Cache: A Scalable Wide-Area Web Cache Sharing Protocol", ACM SIGCOMM, pp. 254-265, 1998.
A. Goldberg and P. Yianilos, "Towards an Archival Intermemory," IEEE International Forum on Research and Technology Advances in Digital Libraries, pp. 147-156, Apr. 1998.
J. Howard, M. Kazar, S. Menees, D. Nichols, M. Satyanarayanan, R. Sidebotham, and M. West, "Scale and Performance in a Distributed File System," ACM Transactions on Computer Systems, pp. 51-81, Feb. 1988.
J, Kistler and M. Satyanarayanan, "Disconnected Operation in the Coda File System," ACM Transactions on Computer Systems, vol. 10 No. 1, pp. 3-25, Feb. 1992.
J. Kubiatowicz et al., "OceanStore: An Architecture for Global-Scale Persistent Storage," Proceedings of the Ninth International Conference on Architectural Support for Programming Languages and Operating Systems, 12 pages, Nov. 2000.
E. Lee and C. Thekkath, "Petal: Distributed Virtual Disks," Seventh International Conference on Architectural Support for Programming Languagues and Operating Systems, pp. 84-92, Oct. 1996.
D. Mazières, M. Kaminsky, M. F. Kaashoek, and E. Witchel, "Separating Key Management from File System Security", 17th ACM Symposium on Operating Systems Principles, pp. 124-139, Dec. 1999.
D.L. McCue, M.C. Little, "Computing Replica Placement in Distributed Systems" IEEE Second Workshop on Replicated Data, pp. 58-61, Nov. 1992.
M. K. McKusick, W. N. Joy, S. J. Leffler, and R. S. Fabry, "A Fast File System for Unix," ACM Transactions on Computer Systems, vol. 2, No. 3, pp. 181-197, Aug. 1984.
The OceanStore Project web pages, http://oceanstore.cs.berkeley.edu/info/overview.html, 2 pages, last modified Jul. 8, 2002.
C. Plaxton, R. Rajaraman, and A Richa, "Accessing Nearby Copies of Replicated Objects in a Distributed Environment", Proceedings of the 9th Annual ACM Symposium on Parrallel Algorithms and Architectures, pp. 311-320, 1997.
C. Plaxton, R. Rajaraman, and A Richa, "Accessing Nearby Copies of Replicated Objects in a Distributed Environment", Theory of Computing Systems, pp. 32:241-280, 1999.
R. T. Reich and D. Albee, S.M.A.R.T. Phase-II, No. WP-9803-001, Maxtor Corporation, 3 pages, Feb. 1988.
J.D. Saltzer and M.D. Schroeder. "The Projection of Information in Computer Systems," Proceedings of the IEEE 63(9), pp. 1278-1308, Sep. 1975.
R. Sandberg, D. Goldberg, S. Kleiman, D. Walsh, and B. Lyon, "Design and Implementation of the Sun Network Filesystem," Summer USENIX Conference, pp. 119-130, Jun. 1985.
A. Sweeney, D. Doucette, W. Hu, C. Anderson, M. Nishimoto, and G. Peck, "Scalability in the XFS File System," USENIX Annual Technical Conference, 15 pages, 1996.

C. Thekkath, T. Mann, and E. Lee, "Frangipani: A Scalable Distributed File System," 16th ACM Symposium on Operating Systems Principles, pp. 224-237, 1997.

W. Vogels, "File system usage in Windows NT 4.0," 17th ACM Symposium on Operating Systems Principles, pp. 93-109, Dec. 1999.

J. Wylie, M. Bigrigg, J. Strunk, G. Ganger, H. Kiliççöte, P. Khosla, "Survivable Information Storage Systems," IEEE Computer, pp. 33(8):61-68, Aug. 2000.

Borg, Digital Signatures Keep Cyberstreets Safe for Shoppers, Computer Technology Review, Vol. 16, No. 2, Feb. 1996 p. 1.

Hu, Some Thoughts on Agent Trust and Delegation, Available at http://www.cs.nccu.edu.tw/jong, 2001, pp. 489-496.

Evans, Matt, "FTFS: The Design of A Fault Tolerant Distributed File System," May 2000, pp. 1-49.

Cheriton, David R. and Mann, Timothy P., "Decentralizing a Global Naming Service for Improved Performance and Fault Tolerance," ACM Transactions on Computer Systems, vol. 7, No. 2, May 1989, pp. 147-183.

* cited by examiner

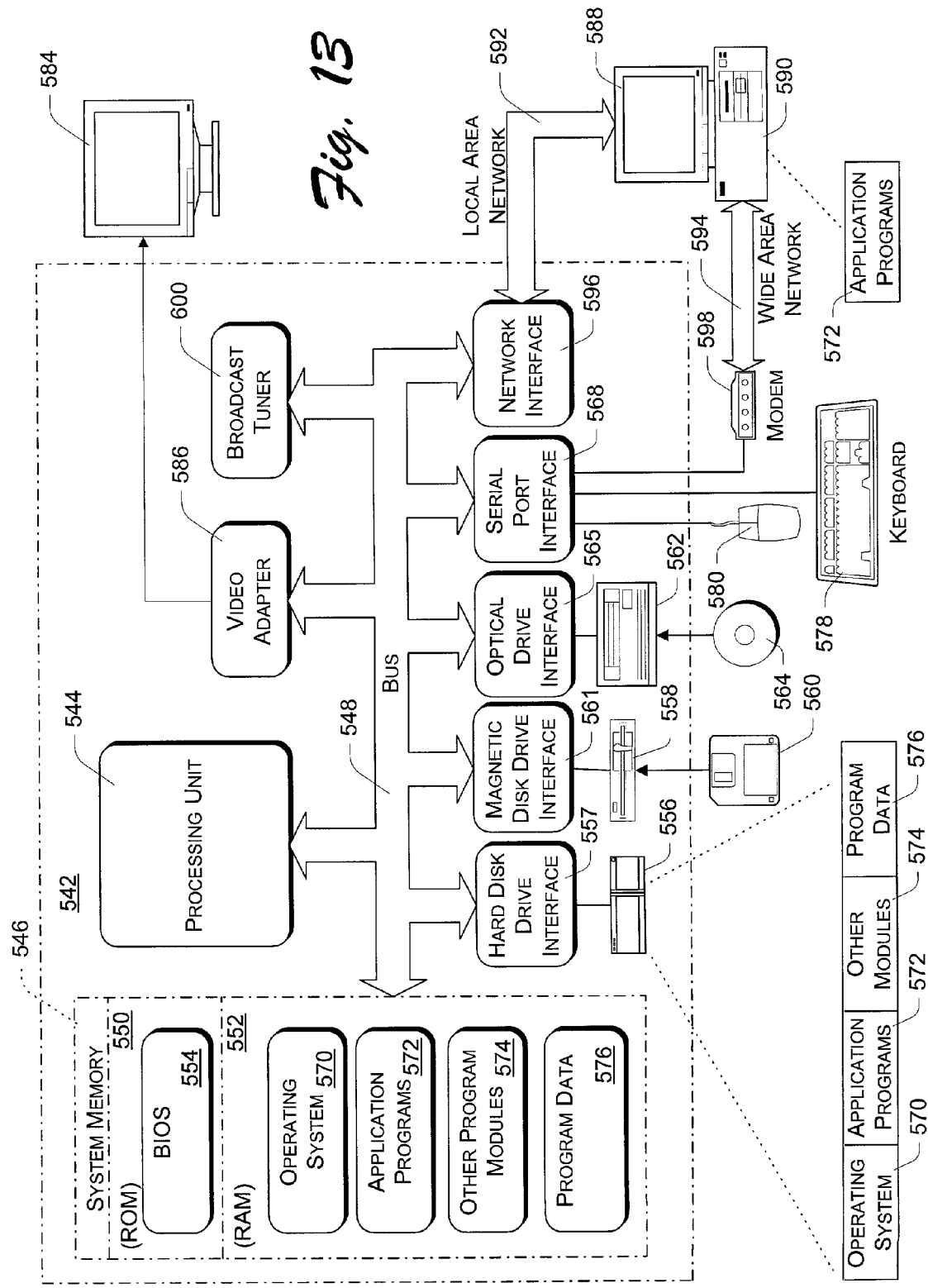

EXCLUSIVE ENCRYPTION

TECHNICAL FIELD

This invention relates to cryptography, and more particularly to cryptosystems that enable enforcement of syntactical and/or semantic requirements on encrypted data.

BACKGROUND OF THE INVENTION

As computer technology has advanced, so too has the need for computer security. One significant area of concern with computer security is the security of data stored by a user of the computer. Such security can include, for example, security against another user reading the data, another user modifying the data (either maliciously or unintentionally), etc. One manner in which such security is currently provided is through encryption. Using encryption, only those users who are supposed to have access to the data (e.g., those users with the decryption key) are able to decrypt and read (and/or modify) the data.

However, situations arise in which encryption creates additional problems. One such situation is in the case where the data is to be verified as being in accordance with a certain set of rules (e.g., a naming syntax), while at the same time maintaining the security/privacy of the data. Current systems typically cannot perform such verifications without reading the underlying data.

For example, in some situations where computers are networked together it would be desirable to have a distributed file system in which different files could be stored on different machines in the network. However, in order to maintain security of the data in the files, it would be beneficial to be able to render both the data and the filename itself unreadable at the computer on which the file is stored, thereby preventing another unauthorized user from gathering information about the data by either reading the data file or the filename. However, maintaining a directory of such encrypted/protected filenames can lead to difficulties, especially due to the fact that the user of the computer on which the data file or filename is stored may not be authorized to read the file. Care must be taken to ensure that the filename syntax is not violated and that duplicate filenames do not exist. Current systems do not have the ability to maintain such a directory of non-duplicate filenames that do not violate the naming syntax while at the same time can be verified by a component that is not authorized to read the filenames.

The invention described below addresses these disadvantages, providing methods and systems for encryption that excludes syntactically illegal plaintext from being encrypted and that enables a party without access to encryption keys to exclude more than one item of ciphertext that decrypts to the same plaintext. For this reason, the invention is referred to as "exclusive encryption."

SUMMARY OF THE INVENTION

Methods and systems for exclusive encryption are described herein.

According to one aspect, an exclusive encryption system is established using multiple computing devices. The exclusive encryption system allows for the exclusion of certain plaintext (e.g., by one of the computing devices) and ciphertext (e.g., by another of the computing devices) while at the same time maintaining the privacy created by the encryption (e.g., so the other computing device cannot see the plaintext).

According to another aspect, an exclusive encryption system is established as part of a serverless distributed file system. The file system is distributed among multiple computing devices, and each directory entry (e.g., a file name or folder name) is encrypted by the device creating (or otherwise using) the entry. The encryption process used ensures that the directory entry is syntactically legal and cannot be read by the device on which the entry is stored. Additionally, the device on which the entry is stored is able to verify the legality of the directory entry, and ensures that duplicate entries are not stored in the same directory.

BRIEF DESCRIPTION OF THE DRAWINGS

The present invention is illustrated by way of example and not limitation in the figures of the accompanying drawings. The same numbers are used throughout the figures to reference like components and/or features.

FIG. 13 shows a general example of a computer that can be used in accordance with the invention

DETAILED DESCRIPTION

Cryptographic methods and systems including exclusive encryption are described herein. Exclusive encryption is used herein to refer to encryption that allows for the exclusion of certain plaintext and ciphertext while at the same time maintaining the privacy created by the encryption. In certain embodiments, these exclusions include the exclusion of syntactically illegal plaintext (e.g., exclusion from being encrypted) and the exclusion of multiple ciphertexts that decrypt to the same plaintext.

The discussions herein assume a basic understanding of cryptography by the reader. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

Figure 1:
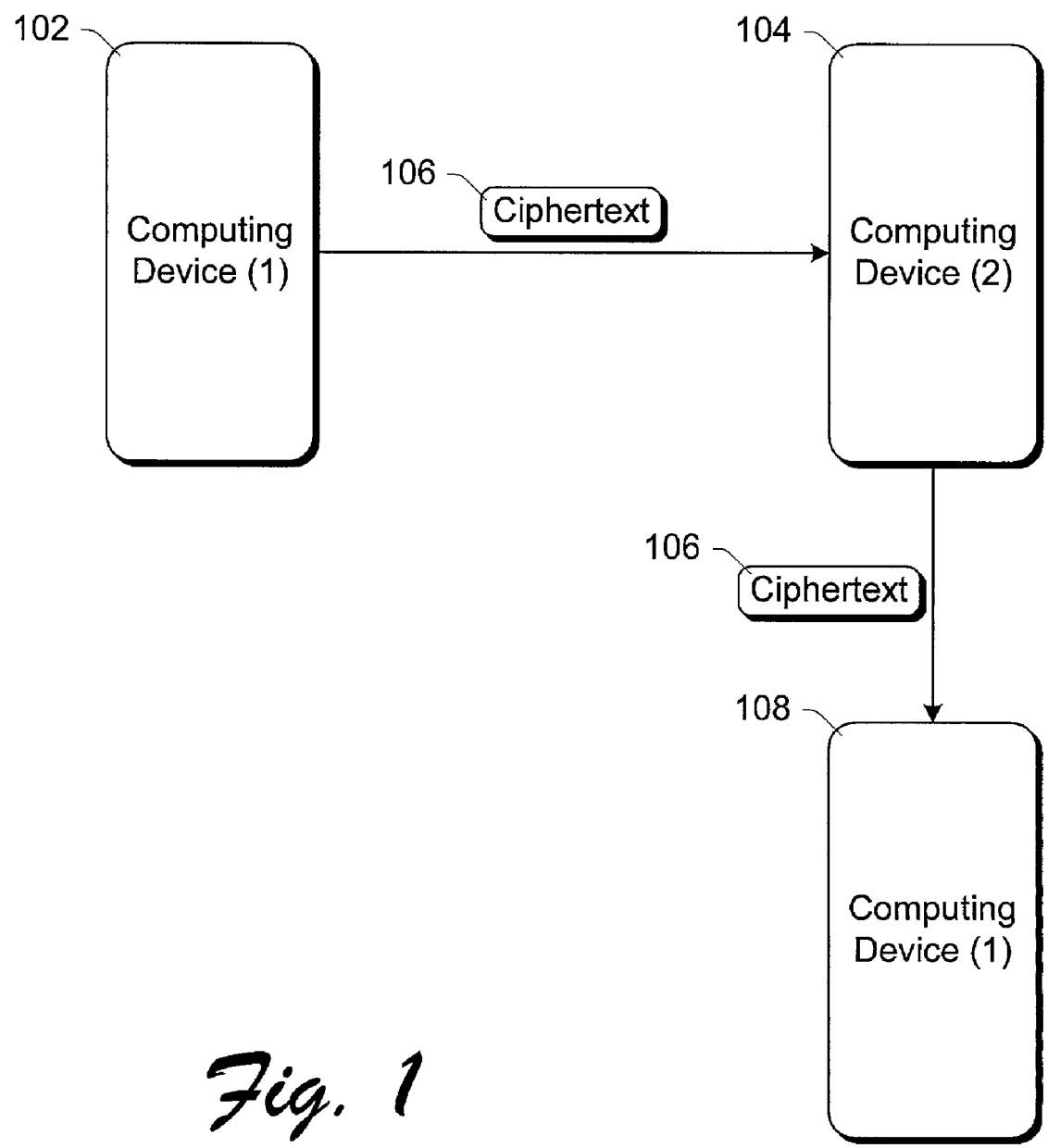
FIG. 1 is a block diagram illustrating an exemplary system in which certain embodiments of the invention can be implemented.

FIG. 1 is a block diagram illustrating an exemplary system in which certain embodiments of the invention can be implemented. A computing device 102 is illustrated coupled to a computing device 104. Computing device 102 communicates ciphertext 106 to computing device 104. Ciphertext 106 can be communicated to computing device 104 for any of a wide variety of uses, such as storage of the ciphertext, verification of the ciphertext, forwarding of the ciphertext, etc. Ciphertext 106 is encrypted using an exclusive encryption cryptosystem that allows computing device 104 to exclude certain types of data (e.g., duplicates) from being processed (e.g., stored, forwarded, etc.) by device 104 without actually determining the underlying plaintext.

Another computing device 108 coupled to computing device 104 may also be able to access, and obtain the ciphertext 106 from, computing device 104. If computing device 108 is not authorized to access the plaintext corresponding to ciphertext 106, then computing device 108 would not be able to decrypt ciphertext 106 (e.g., device 108 would not have the appropriate cryptographic key(s)) and the corresponding plaintext would thus be secure from being viewed by device 108. However, if computing device 108 is authorized to access the plaintext corresponding to ciphertext 106 (e.g., computing device has the appropriate key(s) to decrypt ciphertext 106), then device 108 will be able to obtain the plaintext by decrypting ciphertext 106. Additionally, computing device 108 is assured that the decrypted plaintext will be syntactically legal, regardless of what encrypted bits it receives and regardless of what key(s) it uses.

The methods and systems of the exclusive encryption cryptosystem are discussed herein primarily with reference to a directory service that uses exclusive encryption. However, the invention is not limited to use with directory services and can be used in any of a wide variety of other situations. One example of such a situation is a secure courier service in which a courier guarantees to the message recipient that it will only deliver syntactically valid messages, and it will never deliver a duplicate message, even though the courier is not permitted access to the unencrypted contents of the messages it carries. Another example is a secret-ballot election, in which one wishes to transmit a vote in encrypted form while demonstrating that the vote is of a valid form. Yet another example is "secret sharing", in which portions of a key are distributed; in such situations, one may want to encrypt the "shares" of the key for transmission while demonstrating that the shares are valid.

Figure 2:
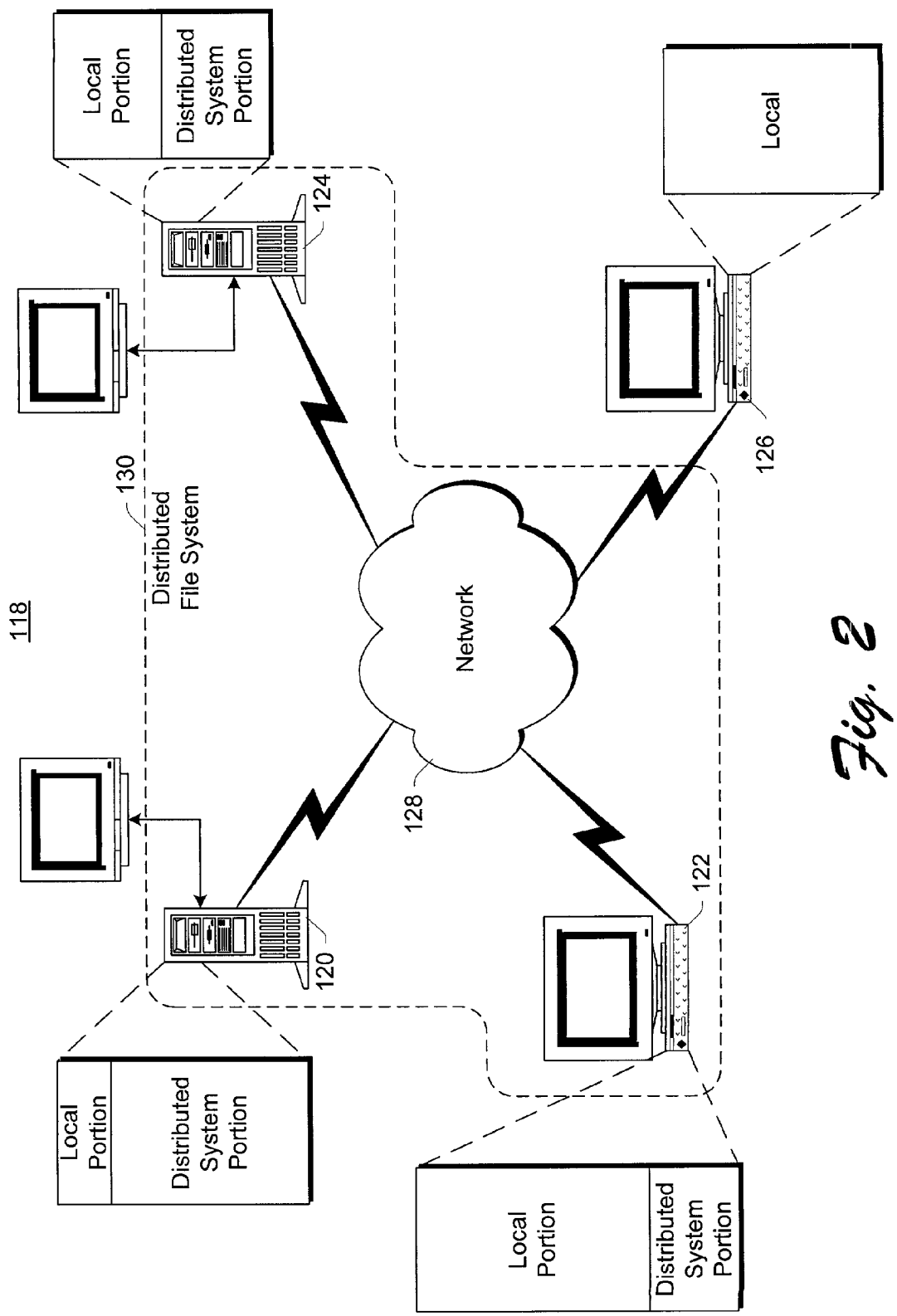
FIG. 2 illustrates an exemplary network environment in which certain embodiments of the invention may be practiced.

FIG. 2 illustrates an exemplary network environment 118 in which certain embodiments of the invention may be practiced. Four client computing devices 120, 122, 124, and 126 are illustrated coupled together via a data communications network 128. Although four computing devices 120–126 are illustrated, different numbers (either greater or fewer than four) may be included in network environment 118.

Network 128 represents any of a wide variety of data communications networks. Network 128 can include public portions (e.g., the Internet) as well as private portions (e.g., an internal corporate Local Area Network (LAN)), as well as combinations of public and private portions. Network 128 can be implemented using any one or more of a wide variety of conventional communications media including both wired and wireless media. Any of a wide variety of communications protocols can be used to communicate data via network 128, including both public and proprietary protocols. Examples of such protocols include TCP/IP, IPX/SPX, NetBEUI, etc.

Computing devices 120–126 represent any of a wide range of computing devices, and each device 120–126 may be the same or different. By way of example, devices 120–126 may be desktop computers, laptop computers, handheld or pocket computers, personal digital assistants (PDAs), cellular phones, Internet appliances, consumer electronics devices, gaming consoles, etc.

Two or more of devices 120–126 operate to implement a serverless distributed file system 130. The actual devices included in the serverless distributed file system 130 can change over time, allowing new devices to be added to the system 130 and other devices to be removed from the system 130. Each device 120–126 that is part of the distributed file system 130 has different portions of its mass storage device (s) (e.g., hard disk drive) allocated for use as either local storage or distributed storage. The local storage is used for data that the user desires to store on his or her local machine and not in the distributed file system structure. The distributed storage portion is used for data that the user of the device (or another device) desires to store within the distributed file system structure. In the illustrated example of FIG. 2, each of devices 120–124 includes one or more mass storage devices that each includes a distributed portion and a local portion. This separation into multiple portions may occur on a per storage device basis (e.g., one hard drive is designated for use in the distributed system 130 while another is designated solely for local use), and/or within a single storage device (e.g., part of one hard drive may be designated for use in the distributed system 130 while another part is designated for local use). Another computing device, device 126, is coupled to network 128 but is not part of the distributed file system 130 and thus does not have any of its mass storage device(s) allocated for use by the distributed system. Device 126, which does not have storage space allocated for use as distributed storage, may be permitted to store files in the distributed portions of one or more of devices 120–124, or alternatively may be prohibited from doing so.

The distributed file system 130 operates to store one or more copies of files on different computing devices 120–124. When a new file is created by the user of a computer 120–126, he or she has the option of storing the file on the local portion of his or her computing device, or alternatively in the distributed file system 130. If the file is stored in the distributed file system 130, then the file will be stored in the distributed system portion of the mass storage device(s) of one or more of devices 120–124. The user creating the file typically has no ability to control which device 120–124 the file is stored on, nor any knowledge of which device 120–124 the file is stored on. Additionally, duplicate copies of the file will typically be saved, allowing the user to subsequently retrieve the file even if one of the computing devices 120–124 on which the file is saved is unavailable (e.g., is powered-down, is malfunctioning, etc.).

The distributed file system 130 is implemented by one or more components on each of the devices 120–124, thereby obviating the need for any centralized server to coordinate the file system. These components operate to determine where particular files are stored, how many copies of the files are created for storage on different devices, etc. Exactly which device will store which files depends on numerous factors, including the number of devices in the distributed file system 130, the storage space allocated to the file system from each of the devices, a number of copies of the file are to be saved, the number of files already stored on the devices, etc. Thus, the distributed file system 130 allows the user to create and access files (as well as folders or directories) without any knowledge of exactly which other computing device(s) the file is being stored on.

The files stored by the file system 130 are distributed among the various devices 120–124 and stored in encrypted form. When a new file is created, the device on which the file is being created encrypts the file prior to communicating the file to other device(s) for storage. The directory entry (e.g., the file name) for a new file is also communicated to the other device(s) for storage. Additionally, if a new folder or directory is created, the directory entry (e.g., folder name or directory name) is also communicated to the other device(s) for storage. As used herein, a directory entry refers to any entry that can be added to a file system directory, including both file names and directory (or folder) names.

The distributed file system 130 is designed to prevent unauthorized users from reading data stored on one of the devices 120–124. Thus, a file created by device 122 and stored on device 124 is not readable by the user of device 124 (unless he or she is authorized to do so). In order to implement such security, the contents of files as well as all directory entries are encrypted, and only authorized users are given the decryption key. Thus, although device 124 may store a file created by device 122, if a user of device 124 is not an authorized user of the file then the user of device 124 cannot decrypt (and thus cannot read) either the contents of the file or its directory name (e.g., filename).

The exclusive encryption described herein allows the directory entry to be stored in an encrypted form, thereby preventing unauthorized users from improperly gaining any information based on the filename. Additionally, the exclusive encryption assures that various properties are maintained. In the illustrated example, the following three properties are maintained:

- no two encrypted entries in a directory will decrypt to the same name
- all encrypted entries in the directory decrypt to syntactically legal names
- the service that maintains the directory does not have access to the plaintext names of the entries Thus, the system is able to ensure both that no two entries in a directory are encryptions of the same name and that all entries in a directory are encryptions of syntactically legal names, while at the same time ensuring that the device maintaining the directory does not have access to the plaintext names of the entries.

Figure 3:
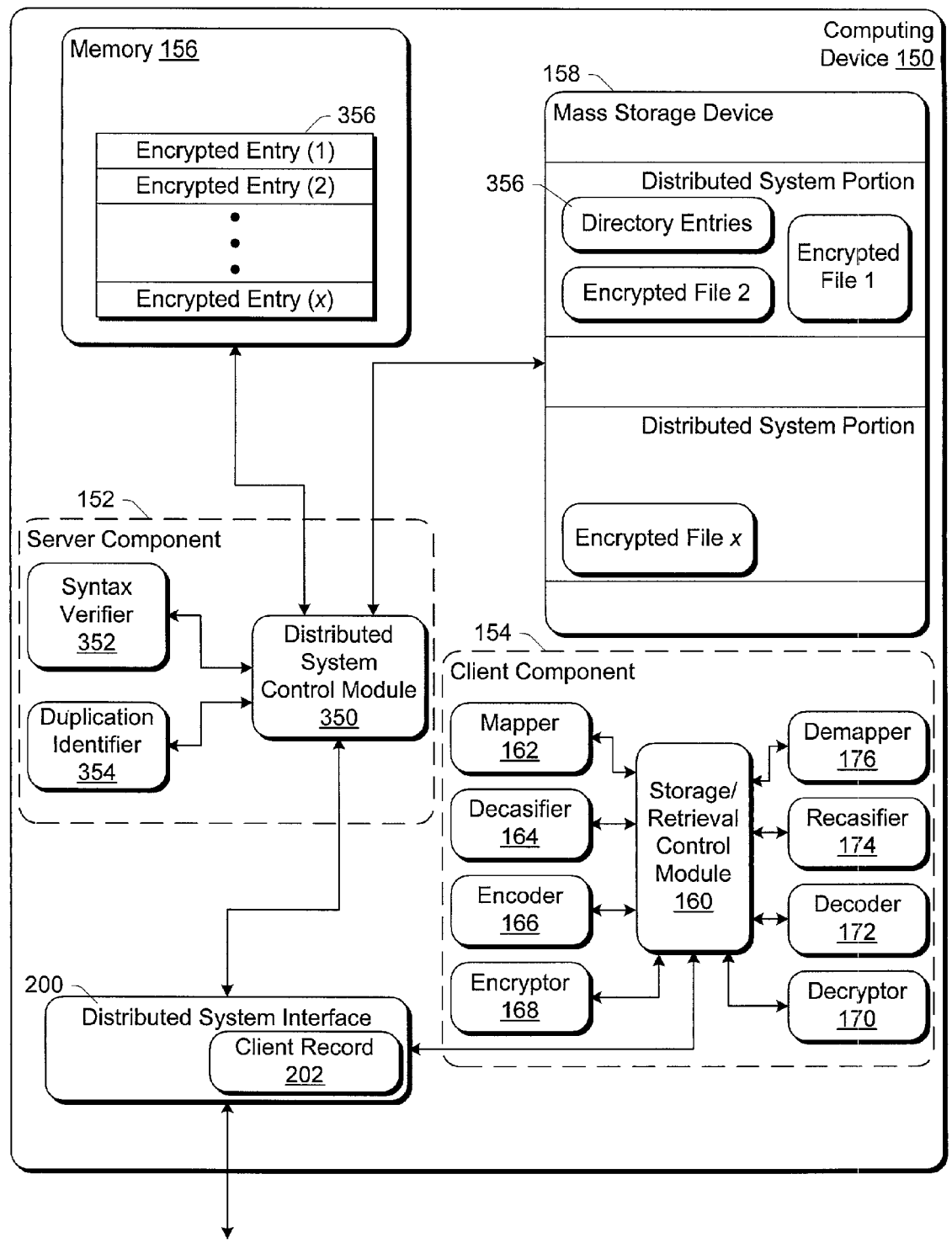
FIG. 3 illustrates an exemplary computing device such as may be used in accordance with certain embodiments of the invention.

FIG. 3 illustrates an exemplary computing device 150 such as may be used in accordance with certain embodiments of the invention. Computing device 150 can be, for example, one of a device 120–124 of FIG. 2. Computing device 150 includes a server component 152, a client component 154, a memory 156, and a mass storage device 158. Computing device 150 also typically includes additional components (e.g., a processor), however these additional components have not been shown in FIG. 3 so as not to clutter the drawings. Memory 156 can be any of a wide variety of conventional volatile and/or nonvolatile memories, such as RAM, ROM, Flash memory, etc. Mass storage device 158 can be any of a wide variety of conventional nonvolatile storage devices, such as a magnetic disk, optical disk, Flash memory, etc.

Computing device 150 is intended to be used in a serverless distributed file system, and as such includes both server component 152 and client component 154. Server component 152 handles requests when device 150 is responding to a request involving a file or directory entry stored (or to be stored) in storage device 158 (although files and corresponding directory entries need not be stored on the same device 150), while client component 154 handles the issuance of requests by device 150 for files stored (or to be stored) in the distributed file system. Client component 154 and server component 152 operate independent of one another. Thus, situations can arise where the serverless distributed file system causes files being stored by client component 154 to be stored in mass storage device 158 by server component 152.

Client component 154 includes a storage and retrieval control module 160, a mapping module 162, a decasifying module 164, an encoding module 166, an encryption module 168, a decryption module 170, a decoding module 172, a recasifying module 174, and a demapping module 176. Control module 160 (in combination with interface 200 discussed below) manages accesses to the serverless distributed file system for the creation, storage, retrieval, and any other modification of files and directories on behalf of computing device 150. Due to the distributed nature of the file system, directory information such as file names and directory names (plaintext names) are modified by computing device 150 prior to being stored in the file system so that the modified names themselves reveal very little information about the original plaintext name, while at the same time allowing the device at which the names will be stored to verify that they are syntactically legal names and are not duplicates. The modified names do leak information about the approximate length of the original plaintext name (although this leak can be avoided in an alternate embodiment discussed below). The modules 162–168 are used to modify plaintext names prior to communicating them to the serverless distributed file system, while modules 170–176 are used to reconstruct the plaintext name when a modified name is received from the serverless distributed file system. The use of these modules and their operation will be discussed with additional reference to FIGS. 4–12.

Figure 4:
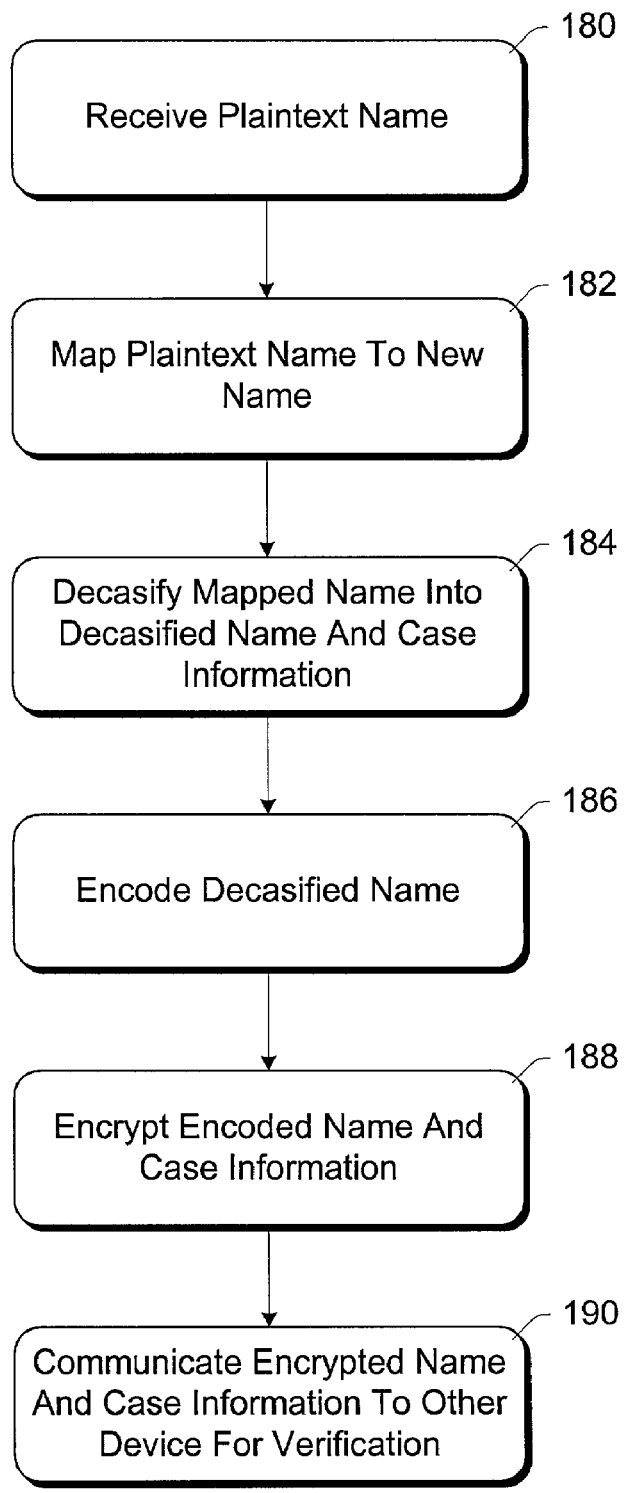
FIG. 4 is a flowchart illustrating an exemplary process for exclusively encrypting a directory entry prior to storage in accordance with certain embodiments of the invention.

FIG. 4 is a flowchart illustrating an exemplary process for exclusively encrypting a directory entry prior to storage in accordance with certain embodiments of the invention. Initially, control module 160 receives a plaintext name that is the directory entry to be encrypted (act 180). The plaintext name is received from another component internal to device 150 (not shown), such as an application, operating system, etc. The received plaintext name is made available to mapper 162 which maps the plaintext name to a new mapped name (act 182). The mapped name is then made available to decasifier 164 which decasifies the mapped name into a decasified name (e.g., a name where the case of the characters has no importance) and corresponding case information (act 184).

The decasified name is then made available to encoder 166 which encodes the decasified name (act 186). The encoded name is then made available to encryptor 168 which encrypts both the encoded name from act 186 and the case information from act 184 (act 188). Control module 160 then communicates the encrypted name and encrypted case information to another device for verification and storage (act 190). This encrypted name and case information are also referred to as ciphertexts.

The process of FIG. 4 is based on the directory entries being case-insensitive. That is, the serverless distributed file system does not distinguish between upper-case and lower-case letters. For example, the entries "MEMO" and "memo" would be the same entries as viewed by the serverless distributed file system. Alternatively, the serverless distributed file system may be case-sensitive. If the system is case-sensitive, then no decasifying is done, and neither decasifier 164 nor decasifying act 184 are needed (and act 188 would not encrypt case information).

After the directory entry is modified per the process of FIG. 4, the directory entry is communicated to another device via a distributed system interface 200. Distributed system interface 200 determines, optionally in collaboration with corresponding interfaces on other devices in the serverless distributed file system, where the directory entry and corresponding file (if any) are to be stored. Interface 200 selects one or more devices, which can include computing device 150, and communicates the directory entry to the selected device. The selection process can be accomplished in a variety of different manners, such as based on the storage space available in the various devices that are part of the serverless distributed file system, an anticipated likelihood that one or more of the various devices will be unavailable at any given moment, etc. Interface 200 also maintains a client storage record 202 that identifies the location of each directory entry (and corresponding file, if any) that is stored by client component 154. Thus, when client component 154 requests retrieval of a particular directory entry interface 200 knows where to locate the requested entry.

Figure 5:
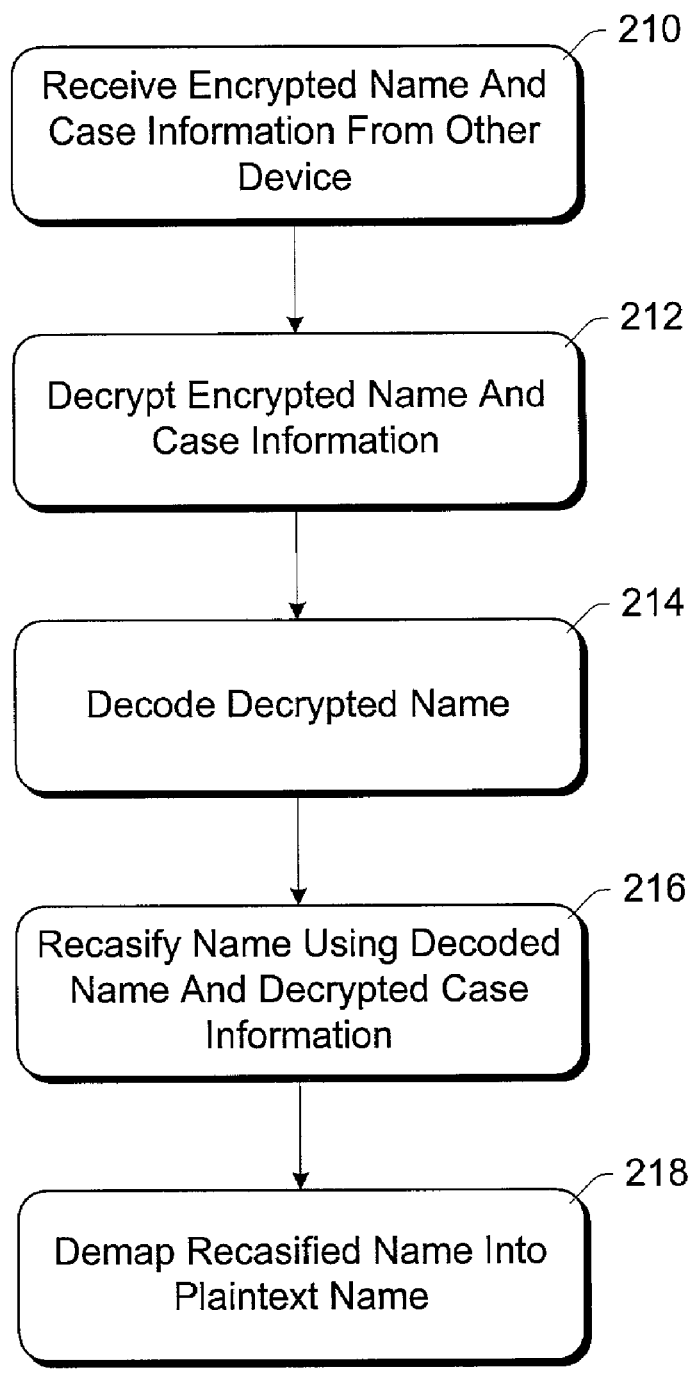
FIG. 5 is a flowchart illustrating an exemplary process for decrypting a received directory entry in accordance with certain embodiments of the invention.

FIG. 5 is a flowchart illustrating an exemplary process for decrypting a received directory entry in accordance with certain embodiments of the invention. Initially, control module 160 receives an encrypted name and encrypted case information (ciphertexts) from another device via interface 200 (act 210). The encrypted name and encrypted case information are made available to decryptor 170 which decrypts both the name and the case information (act 212). The decrypted name is then made available to decoder 172 which decodes the decrypted name (act 214).

The decoded name and decrypted case information are then made available to recasifier 174 which uses the case information to recasify the decoded name (act 216). The recasified name is then made available to demapper 176 which demaps the recasified name into the plaintext name (act 218).

The process of FIG. 5 is based on the directory entries being case-insensitive. Alternatively, if the serverless distributed file system is case-sensitive, then no recasifying is done, and neither recasifier 174 nor recasifying act 216 are needed (and no decryption of case information is performed in act 212).

An exemplary implementation of the modules 162–176 will now be discussed.

Figure 6:
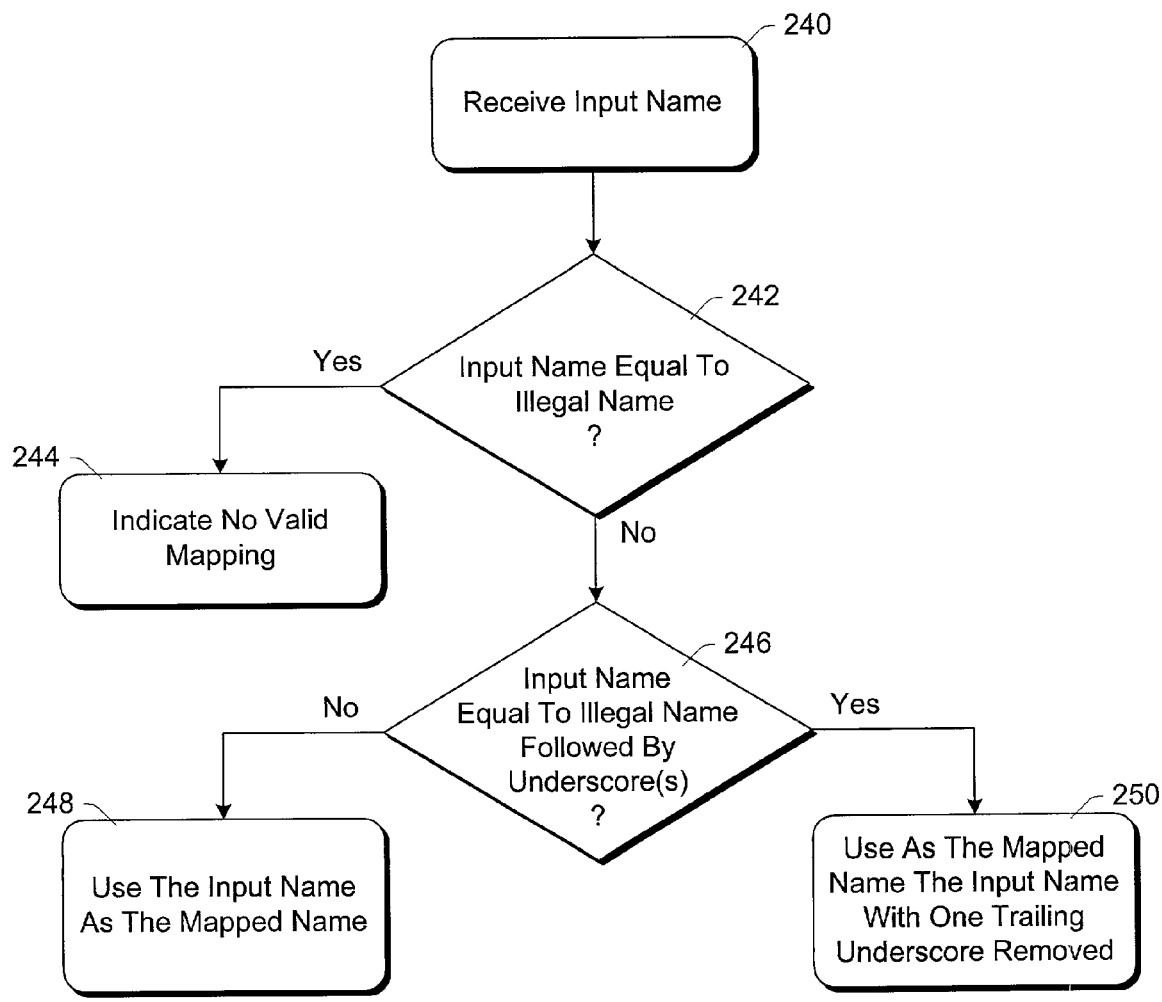
FIG. 6 is a flowchart illustrating an exemplary process for mapping a plaintext name to a mapped name in accordance with certain embodiments of the invention.

Mapping module (mapper) 162 maps a received plaintext name into a mapped name. FIG. 6 is a flowchart illustrating an exemplary process for mapping the plaintext name to the mapped name in accordance with certain embodiments of the invention. Mapping module 162 initially receives the input plaintext name (act 240). Mapping module 162 may receive the actual name, or alternatively an indication of where the name can be found (e.g., a pointer to the name).

Mapping module 162 then checks whether the input plaintext name is an illegal name (act 242). Mapping module 162 includes a record of illegal names, which may be pre-programmed or defined in module 162 or alternatively provided to module 162 by some other component (e.g., module 160). In one implementation, the following strings (regardless of case) are illegal names: CONIN$, CONOUT$, CON, PRN, AUX, NUL, LPTn, COMn (where n represents any digit 0 through 9). Alternatively, the illegal names may include more or fewer (and/or different) strings. Additionally, the set of illegal names may be the empty set, which is equivalent to there being no illegal names. If there are no illegal names, then neither mapping module 162 (nor mapping act 242) need be included, and demapping module 176 and any demapping acts (discussed in more detail below) also need not be included.

If the plaintext name is equal to any one of these illegal names then an indication that no valid mapping exists is given to module 160 (act 244) and the modification process of FIG. 4 fails. However, if the input plaintext name is not an illegal name, then module 162 checks whether the input plaintext name is an illegal name followed by one or more underscore characters, such as the name "CON_" or "PRN_", (act 246). If the input name is not an illegal name followed by one or more underscore characters, then the input plaintext name is used as the mapped name (act 248). In other words, the input name maps to itself. However, if the input name is an illegal name followed by one or more underscore characters, then the mapped name is the input name with one trailing underscore removed (act 250). For example, the input name "CON_" would map to "CON", and the input name "PRN_" (having two underscores) would map to "PRN_" (having one underscore).

Alternatively, other characters may be used by mapping module 162 other than an underscore. Any character (e.g., letter, number, other symbol, etc.) can be used in place of the underscore, so long as adding a string of zero or more such characters to an illegal name does not result in another illegal name.

Figure 7:
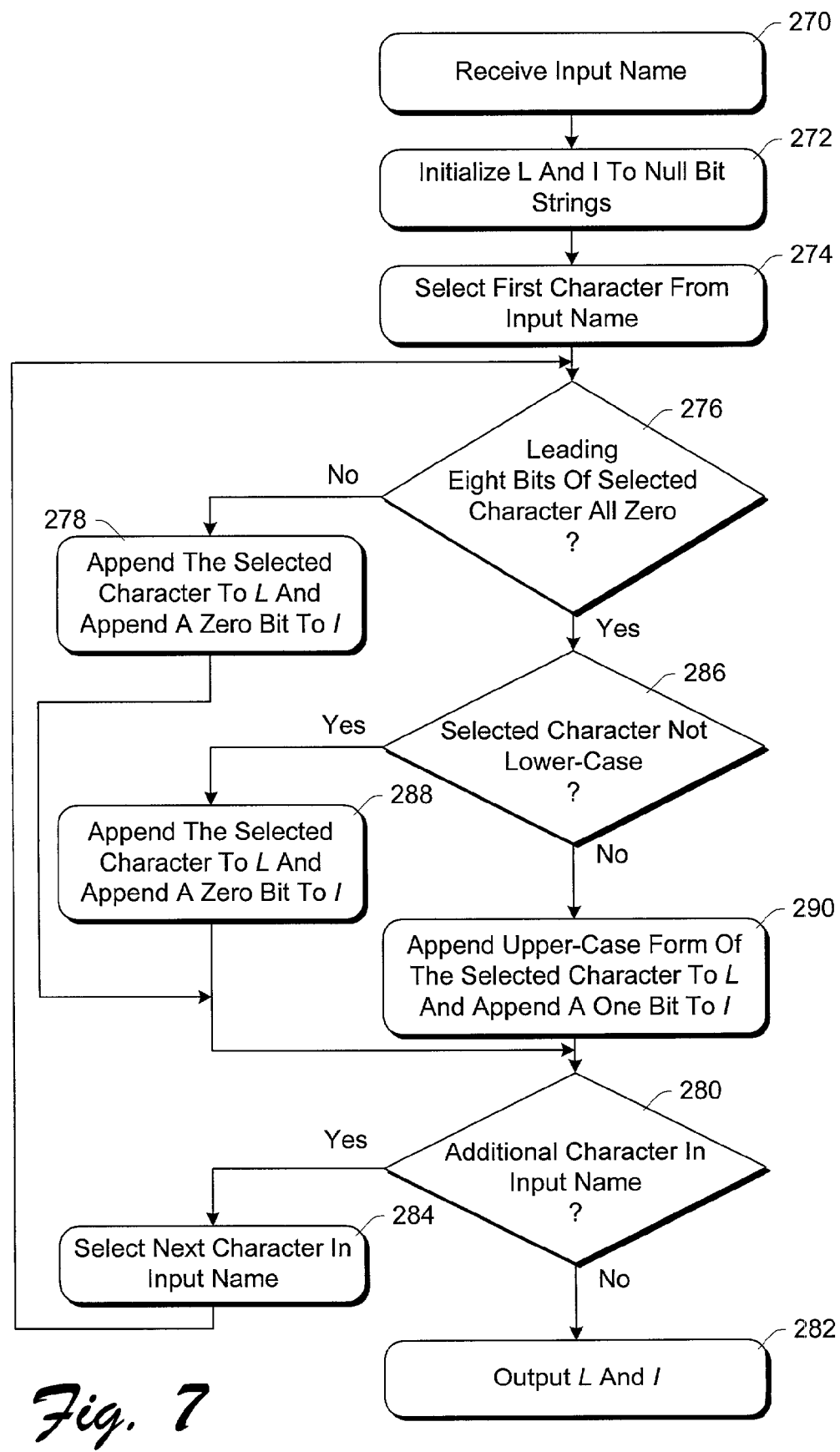
FIG. 7 is a flowchart illustrating an exemplary process for decasifying a mapped name in accordance with certain embodiments of the invention.

Once mapped, the mapped name is decasified by decasifying module (decasifier) 164. FIG. 7 is a flowchart illustrating an exemplary process for decasifying the mapped name in accordance with certain embodiments of the invention. Decasifying module 164 initially receives the input mapped name (act 270). Decasifying module 164 may receive the actual name, or alternatively an indication of where the name can be found (e.g., a pointer to the name), from module 160 or alternatively directly from mapping module 162.

Module 164 then initializes two strings, referred to as the L and the I strings, to null (act 272). At the end of the decasifying process, the L string will be the decasified version of the input name received in act 270, and the I string will be a set of bits that identify the appropriate case for each of the characters in the L string. Module 164 operates to decasify names based on the Unicode standard including current and future versions of the standard. Additionally information regarding the Unicode standard is available from The Unicode Consortium of Mountain View, Calif. The Unicode standard uses sixteen bits to identify each character, but it is an evolving standard, so not all 65,536 combinations are defined. However, the conventional ASCII character set (which includes the uppercase and lowercase English alphabet, numbers, and many symbols commonly used in English) is defined using the last seven bits of the sixteen Unicode bits (with the first nine bits being all zeroes). Thus, characters with Unicode values between 0 and 127 are equivalent to characters with identical ASCII values. Furthermore, characters with Unicode values between 128 and 255 have all been defined, and they include characters that, together with the first 128 Unicode characters, are sufficient to display text in most Latinate languages These 256 characters are sometimes referred to as the "extended ASCII" character set. Due to the evolving nature of the Unicode standard, module 164 is implemented so as to decasify only those characters with Unicode values less than or equal to 255 (that is, the extended ASCII character set). Module 164 does not attempt to decasify any character in the input mapped name having a Unicode value greater than 255. Alternatively, additional characters may be decasified, such as any characters which are defined in the Unicode standard.

To decasify the received name, module 164 selects the first character from the input name (act 274). Module 164 then checks whether the leading eight bits of the selected character are zero (act 276). If the leading eight bits are not all zero (that is, the character has a Unicode value greater than 255) then module 164 appends the selected character to the L string and a zero bit to the I string (act 278). Module 164 then checks whether there are any additional characters in the input name (act 280). If there are no additional characters, then module 164 outputs the decasified name as the L string and the corresponding case information as the I string (act 282). However, if there are additional characters, then module 164 selects the next character in the input name (act 284) and returns to check whether each of the leading eight bits of the selected character is zero (act 276).

Returning to act 276, if the leading eight bits of the selected character are all zeroes, then module 164 checks whether the selected character is not a lowercase character (act 286). It should be noted that the phrase "not a lower-case character" is not equivalent to the phrase "an upper-case character". For example, the asterisk symbol (*) has no case distinction and thus would not be a lower-case character, but also would not be an upper-case character.

If the selected character is not a lower-case character, then the selected character is appended to the L string and a zero bit is appended to the I string (act 288), and the process continues to act 280 to check whether any additional characters are in the input name. However, if the selected character is a lowercase character, then the upper-case form of the selected character is appended to the L string and a one bit is appended to the I string (act 290), and the process continues to act 280 to check whether any additional characters are in the input name.

By way of example, following the process of FIG. 7, if the input name were "Memo.doc", then module 164 would output as the decasified name (L string) "MEMO.DOC", and as the case information (I string) "01110111".

In the illustrated example of FIG. 7, a zero bit in case information string I is used to signify that a character is upper-case or has no case distinction, and the decasified name (L string) is all non-lower case characters. Various alterations can be made to this process, such as having upper-case characters signified by a one bit, having characters with no case distinction signified by a one bit, having the decasified name all non-upper case characters, etc.

Figure 8:
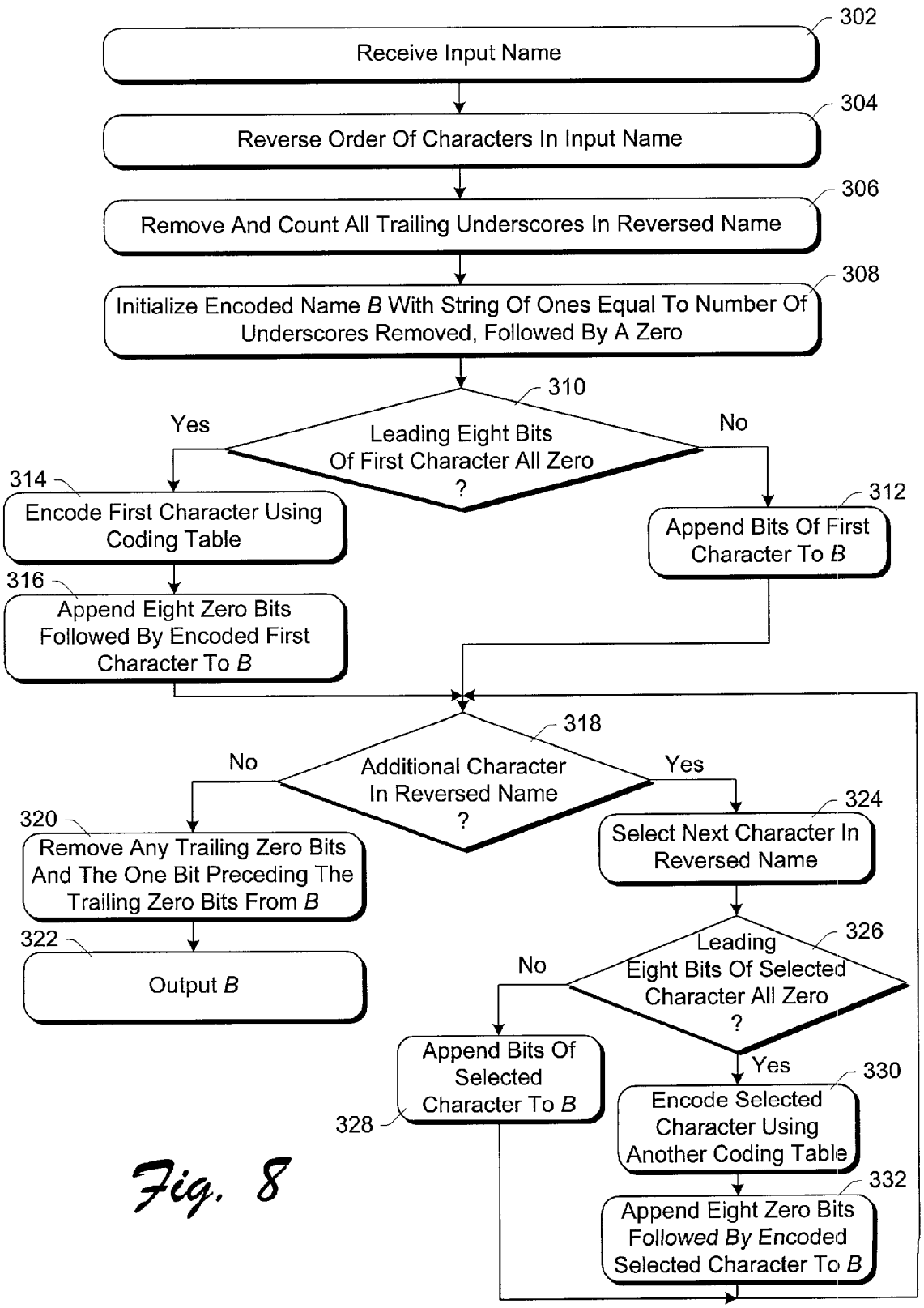
FIG. 8 is a flowchart illustrating an exemplary process for encoding a decasified name in accordance with certain embodiments of the invention.

Once decasified, the decasified name is encoded by encoding module (encoder) 166. FIG. 8 is a flowchart illustrating an exemplary process for encoding the decasified name in accordance with certain embodiments of the invention. Encoding module 166 initially receives the input decasified name (act 302). Encoding module 166 may receive the actual name, or alternatively an indication of where the name can be found (e.g., a pointer to the name), from module 160 or alternatively directly from decasifying module 164 (or mapping module 162 if the system is case-sensitive).

The characters of the input name are then reversed (act 304) and the number of trailing underscores in the reversed name counted and removed (act 306). An encoded bit stream B (which will be the output encoded name at the end of the encoding process) is then initialized with a string of one bits equal to the number of underscores removed in act 306, followed by a zero (act 308). If there are no trailing underscores, then the encoded bit stream B is initialized with a single zero bit. Alternatively, rather than relying on underscores, different characters may be used. In one implementation, the character that is Huffman coded to zero is the character that is counted and removed from the end of the reversed name (Huffman coding is discussed in more detail below).

Module 166 then checks whether the leading eight bits of the first character in the reversed name are all zero (act 310). If the leading eight bits are not all zero, then the sixteen bits of the first character are appended to the encoded bit stream B (act 312). However, if the leading eight bits of the first character are all zero, then the character (based on the last eight bits) is encoded using a first coding table (act 314), and then eight zero bits followed by the bits from the coding table are appended to the encoded bit stream B (act 316).

The coding table in act 314 can be generated in any of a wide variety of conventional manners using any of a wide variety of prefix coding schemes. In one implementation, conventional Huffman coding is used, although other coding schemes could alternatively be used. In the illustrated example, the coding table in act 314 codes an underscore to all zeroes and has codes for all valid non-lower case characters with Unicode values less than 256 and greater than 31, except for the following: space, period, quotation mark, asterisk, forward slash, colon, greater than symbol, less than symbol, question mark, back slash, or vertical line. If module 166 is given an input name with a character that is the first character in act 308 and is not in the coding table, then the coding process fails, as does the modification process of FIG. 4.

Regardless of the bits added to encoded bit stream B in either act 312 or 316, module 166 proceeds to check whether there is an additional character in the reversed name (act 318). If there are no more characters in the reversed name, then module 166 removes any trailing zero bits and the one bit preceding the trailing zero bits from the encoded bit string B (act 320). Module 166 then outputs the encoded bit string B as the encoded name (act 322).

Returning to act 318, if there are additional characters in the reversed name, then the next character in the reversed name is selected (act 324) and a check made as to whether the leading eight bits of the selected character are all zero (act 326). If the leading eight bits are not all zero, then the sixteen bits of the selected character are appended to the encoded bit stream B (act 328). However, if the leading eight bits of the selected character are all zero, then the character (based on the last eight bits) is encoded using another coding table (act 330), and then eight zero bits followed by the bits from the coding table are appended to the encoded bit stream B (act 332).

Analogous to the coding table discussed in act 314 above, the coding table used in act 330 can be generated in any of a wide variety of conventional manners using any of a wide variety of prefix coding schemes. In one implementation, conventional Huffman coding is used, although other coding schemes could alternatively be used. In the illustrated example, the coding table in act 330 codes an underscore to all zeroes and has codes for all valid non-lower case characters with Unicode values less than 256 and greater than 31, except for the following: quotation mark, asterisk, forward slash, colon, greater than symbol, less than symbol, question mark, back slash, or vertical line. These codes may be the same as those in the table of act 314, or alternatively different. If module 166 is given an input name with a character that is the selected character in act 324 and is not in the coding table, then the coding process fails, as does the modification process of FIG. 4.

Regardless of the bits added to encoded bit stream B in either act 328 or 332, module 166 proceeds to check whether there is an additional character in the reversed name (act 318), and proceeds accordingly. In the illustrated example of FIG. 8, each additional character is encoded using the other coding table in act 330. Alternatively, the same coding table as was used in act 314 may be used in act 330. In another alternative, multiple additional coding tables are used in act 330 for encoding additional characters. For example, there may be a different coding table for each additional character or groups of characters.

Once encoded, the encoded name (encoded bit string B of FIG. 8) is encrypted by encryption module (encryptor) 168. Encryption module 168 initially receives the encoded name (or an indication of where the name can be found) from module 160 or alternatively directly from encoding module 166 (act 302). Encryption module 168 can use any of a wide variety of encryption schemes to encrypt the encoded name. The encryption scheme used, however, should be surjective so that any arbitrary string of bits will decrypt to a valid encoded name, and it should be deterministic so that identicality of names can be determined by examining only their encrypted forms. In the illustrated example, a conventional block cipher is used, although other types of ciphers could alternatively be used (e.g., a stream cipher).

Given that the encoded bit string B can be of varying length, additional bits are added to the bit string B as necessary to bring the bit string up to a length that is a multiple of the block size for the block cipher. In one implementation, this addition (also referred to as padding) to bit string B is accomplished by prepending to the bit string B (adding to the beginning of the bit string B) a one bit preceded by as many zero bits as necessary to bring the length of the bit string up to a multiple of the cipher block size. Encryption module 168 then encrypts the padded bit string B on a per-block (x) basis according to the following three rules:

(1) if the block x of bit string B has the value of zero, then the encrypted block has a value of zero;

(2) otherwise, if the result of encrypting block x with a block cipher encryption E is zero, then the encrypted block has a value equal to the encryption E of the value zero; and (3) if neither rule (1) nor (2) applies, then the encrypted block has a value equal to the encryption E of the block.

Any of a wide variety of conventional block ciphers can be used as block cipher encryption E. In one implementation, block cipher encryption E is the well-known RC2 block cipher. Other conventional block ciphers can alternatively be used, such as DES, RC5, AES/Rijndael, and so forth.

It should also be noted that encryption module 168, using these rules, will not result in an encrypted name with a first block equaling zero. This is true even if the encryption uses a feedback mechanism such as cipher block chaining (CBC) to increase the security of the encrypted data. In CBC mode, the plaintext of each block is exclusively ORed (XORed) with the ciphertext of the previous block before it is encrypted, thereby making each ciphertext block dependent not only on the corresponding plaintext block but also on all previous plaintext blocks.

The resulting encrypted blocks are the encrypted name to be communicated to another device (act 190 of FIG. 4).

In addition to encrypting the name, the case information I is also encrypted. The case information I is encrypted using any of a wide variety of conventional block ciphers. The block cipher may be the same as used for encrypting the encoded name, or alternatively a different block cipher. Additionally, the case information may be prepended with a one bit preceded by as many zero bits as necessary to bring the length of the case information up to a multiple of the size of the block cipher, analogous to the padding of the encoded bit string B discussed above. Alternatively, additional random padding may be added to the end of the case information I to bring it up to a multiple (not necessarily the next closest multiple) of the block cipher size. Any such additional information is ignored when recasifying the decoded name as discussed in more detail below.

Once generated, the encrypted directory entry is communicated to one or more other computing devices 150. As discussed above, this is typically a different device 150 than the device that generated the encrypted directory entry, although it could be the same device. Regardless of the source of the encrypted directory entry, the distributed system interface 200 at the receiving device 150 communicates the directory entry to server component 152.

Server component 152 includes a distributed system control module 350, a syntax verifier 352, and a duplication identifier 354. Distributed system control module 350 receives the encrypted directory entry and communicates the entry to syntax verifier 352 to verify that the entry is syntactically legal, and duplication identifier 354 to verify that the entry is not a duplicate of another entry in the distributed file system. Distributed system control module 350 maintains a record 356 of the encrypted directory entries that are stored at computing device 150 (or alternatively that are stored in all of the serverless distributed file system). In addition to having record 356 available in memory 156, if memory 156 is a volatile memory then record 356 is also stored in a nonvolatile memory (such as mass storage device 158) in order to preserve record 356 if computing device 150 is powered-down. Additionally, distributed system control module 350 communicates with mass storage device 158 to store and retrieve encrypted files corresponding to encrypted directory entries in record 356.

Syntax verifier 352 verifies that the syntax of a received directory entry is valid. In the illustrated example, syntax verifier 352 checks whether the first block of the encrypted directory entry is zero. If the first block is zero, then the directory entry is not syntactically legal; otherwise, the directory entry is syntactically legal.

Duplication identifier 354 compares the received encrypted directory entry to the other encrypted directory entries stored in record 356. If the received encrypted entry matches any of the encrypted entries stored in record 356 in the same folder as the received encrypted entry will be placed in, then the received entry is a duplicate; otherwise the received entry is not a duplicate. Note that the serverless distributed file system prevents multiple files or folders within the same directory or folder from having the same name, but does not prevent different files in different folders from having the same name. For example, two files in the same directory could not be named "memo.doc", but two files in two different directories could be named "memo- .doc". Record 356 maintains an indication, for each entry, of which folder or directory the entry is in.

Figure 9:
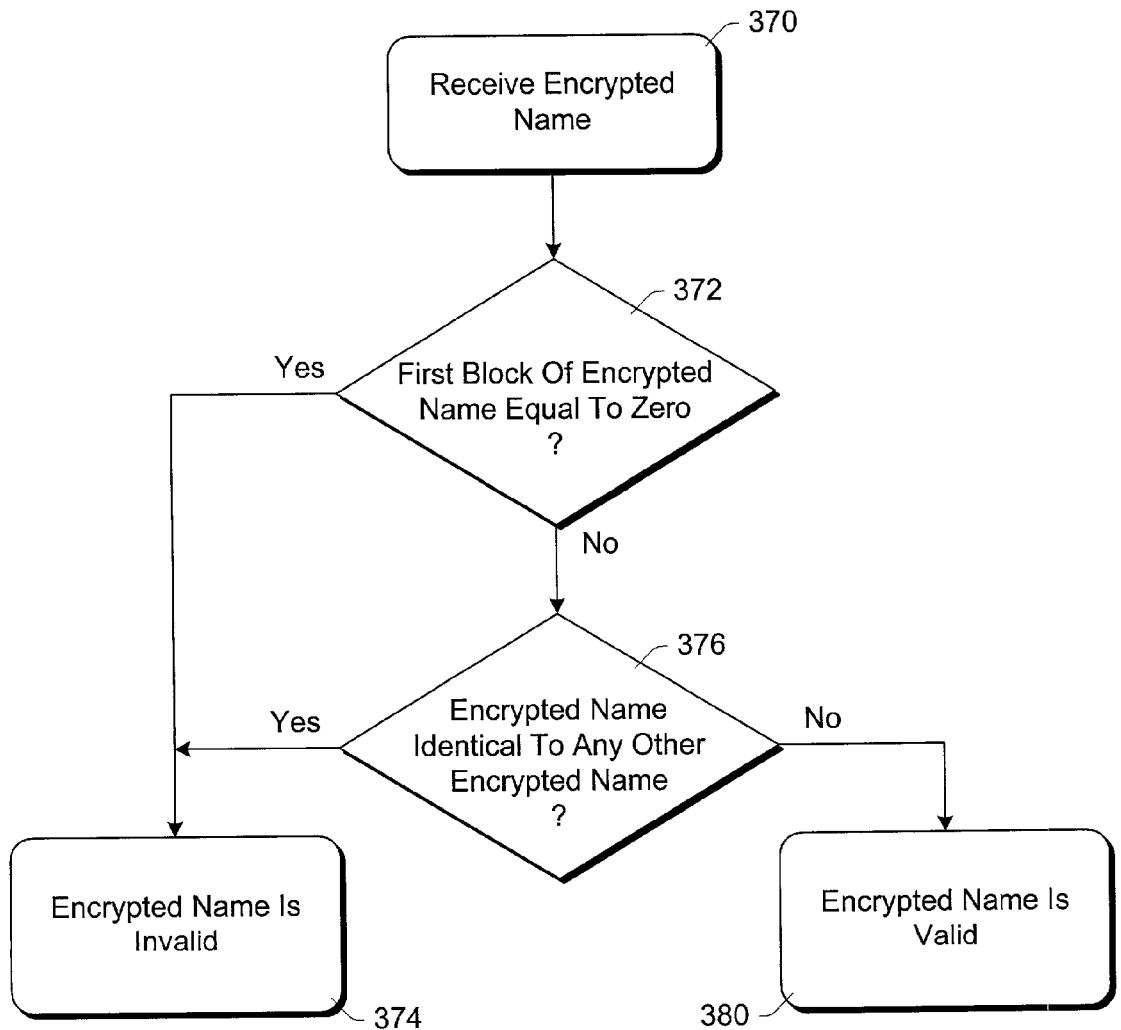
FIG. 9 is a flowchart illustrating an exemplary process for verifying a received directory entry in accordance with certain embodiments of the invention.

FIG. 9 is a flowchart illustrating an exemplary process for verifying a received directory entry in accordance with certain embodiments of the invention. Initially, the encrypted name is received by distributed system control module 350 (act 370). Syntax verifier 352 then checks whether the first block of the encrypted name is zero (act 372). If the first block is zero, then the encrypted name is invalid (act 374). However, if the first block is not zero, then duplication identifier 354 checks whether the encrypted name is identical to any other encrypted name in the directory (act 376). If the encrypted name is identical to another encrypted name in the directory, then the encrypted name is invalid (act 374); otherwise, the encrypted name is valid (act 380).

As mentioned above, the exclusive encryption described herein maintains the following three properties:
- no two encrypted entries in a directory will decrypt to the same name
- all encrypted entries in the directory will decrypt to syntactically legal names
- the service that maintains the directory does not have access to the plaintext names of the entries Distributed system control module 350 ensures that no two entries in a directory can be duplicates (based on the comparison performed by duplication identifier 354). Encryption of the directory entry using the block or other cipher ensures that the service that maintains the directory does not have access to the plaintext names of the entries.

The encryption process does not result in an encrypted name having a first block that equals zero. Thus, any encrypted name having a first blocker equal to zero is an illegal entry and is detected by syntax verifier 352. Additionally, in one implementation a directory entry must satisfy the following criteria in order to be syntactically legal:
- the directory entry name cannot be null (the encoding process discussed above with reference to FIG. 8 admits no null name)
- the directory entry name cannot include any character with an ASCII or Unicode value less than 32 (the encoding process discussed above with reference to FIG. 8 admits no such characters)
- the directory entry name may not include any of the following characters: "* /:< > ? \ | (the encoding process discussed above with reference to FIG. 8 can be configured to admit no such characters)
- the final character of a directory entry name may not be a space or a period (the encoding process discussed above with reference to FIG. 8 can be configured to admit no such final characters)
- the following names are illegal (where n is any digit): CONIN$, CONOUT$, CON, PRN, AUX, NUL, LPTn COMn (the mapping process discussed above with reference to FIG. 6 can be configured to admit no such names)
- for purposes of determining duplication, character case is ignored (the decasifying process discussed above with reference to FIG. 7 decasifies the entry names)

Given that the directory entries are stored in an encrypted manner, when a computing device 150 retrieves the entries from another device in the serverless distributed file system, the entries need to be converted to plaintext to be useable by other components in the device. The general process for converting the received encrypted name and case information into a plaintext name is discussed above with reference to FIG. 5. One implementation of the process will be described in more detail below.

Initially, the encrypted name (bit string B discussed above) and the encrypted case information are decrypted by decryption module (decryptor) 170. The decryption process is the reverse of the encryption process discussed above. Initially, the prepended encoded name B is decrypted on a per-block (x) basis according to the following rules:

(1) if the block x of bit string B has the value of zero, then the decrypted block has a value of zero;

(2) otherwise, if the result of decrypting block x with a block cipher decryption $E^{-1}$ is zero, then the decrypted block has a value equal to the decryption $E^{-1}$ of the value zero; and (3) if neither rule (1) nor (2) applies, then the decrypted block has a value equal to the decryption $E^{-1}$ of the block. The block cipher decryption $E^{-1}$ is the decryption that corresponds to block cipher encryption E.

The result of this decryption process is the prepended encoded name B, from which decryption module 170 discards all leading bits up to and including the first one bit.

Decryption module 170 decrypts case information analogous to the decryption of prepended encoded name B. However, if any additional random padding was added to the end of the case information prior to encryption, this additional padding remains part of the decrypted case information and is simply ignored during the recasification process discussed below.

Figure 10:
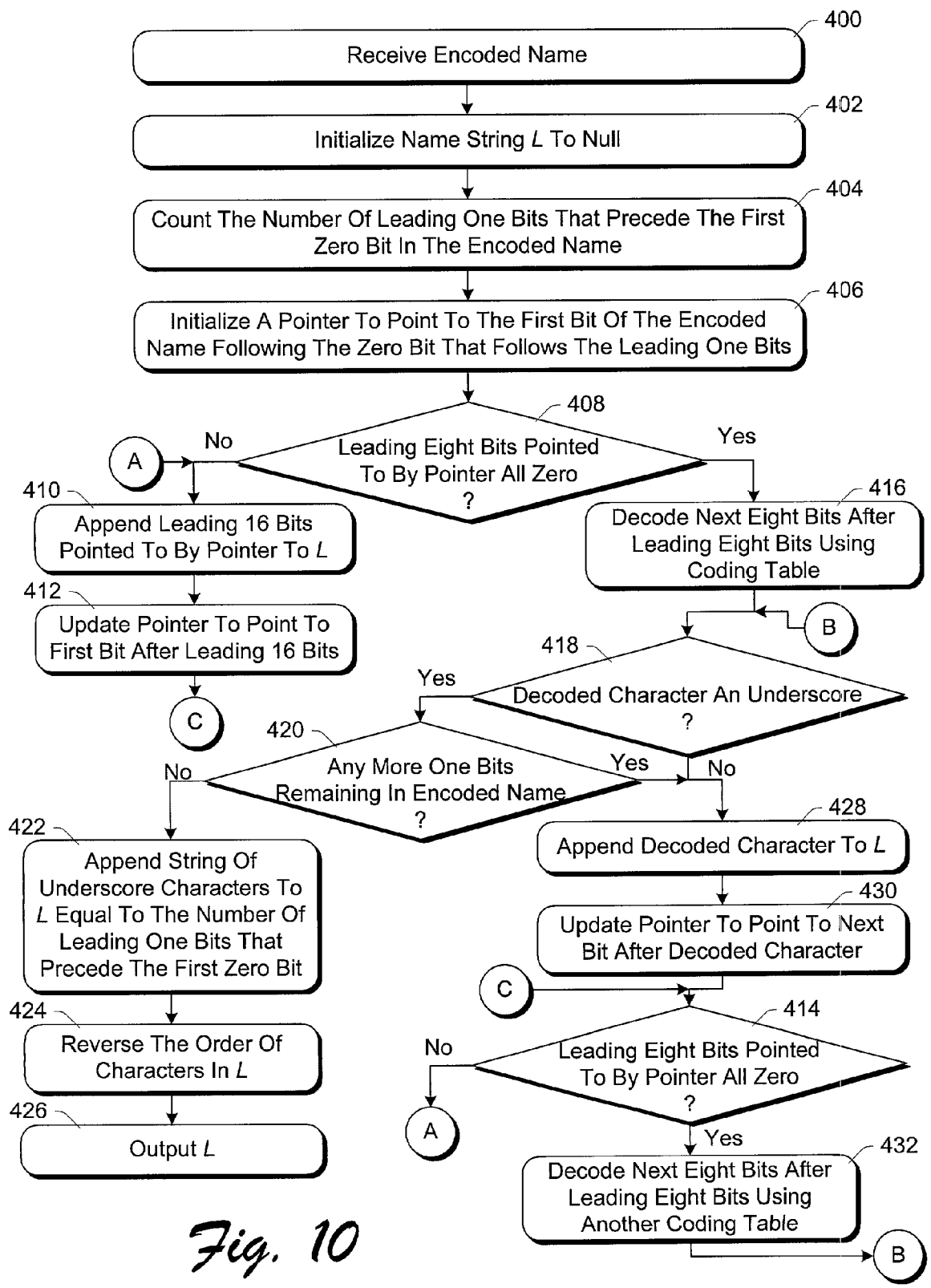
FIG. 10 is a flowchart illustrating an exemplary process for decoding an encoded name in accordance with certain embodiments of the invention.

Once decrypted, decoding module (decoder) 172 decodes the encoded name B. FIG. 10 is a flowchart illustrating an exemplary process for decoding an encoded name in accordance with certain embodiments of the invention. Initially, decoding module 172 receives the encoded name (act 400), either from control module 160 or directly from decryption module 170. Decoding module 172 then initializes a name string L to null (act 402). The name string L will be the decoded name output by module 172 upon completion of the process of FIG. 10. The encoded name is also extended, if necessary, by appending a one bit followed by as many zero bits as needed to complete the process described in FIG. 10.

The number of leading one bits that precede the first zero bit in the encoded name B are then counted (act 404) and a pointer initialized to point to the first bit of the encoded name following the zero bit that follows the leading one bit (act 406). Decoding module 172 then checks whether the leading eight bits pointed to by the pointer are all zeroes (act 408). If the leading eight bits are not all zeroes, then module 172 appends the leading sixteen bits pointed to by the pointer to the name string L (act 410), updates the pointer to point to the first bit after the leading sixteen bits (act 412), and proceeds to check whether the leading eight bits pointed to by the pointer are all zeroes (act 414).

Returning to act 408, if the leading eight bits pointed to by the pointer are all zeroes, then module 172 decodes the next eight bits after the leading eight bits using a coding table (act 416). The coding table used in act 416 is the same as the coding table used in act 314 of FIG. 8. Decoding module 172 then checks whether the decoded character is an underscore (act 418). If the decoded character is an underscore, then module 172 checks whether any more one bits remain in the encoded name B (act 420). If no more one bits remain, then decoding module 172 appends a string of underscore characters to L equal in number to the number of leading one bits that preceded the first zero bit as counted in act 404 above (act 422). The order of the characters in L is then reversed (act 424) and L is output as the decoded name (act 426).

Returning to acts 414 and 418, if the decoded character is not an underscore (act 418) or more one bits remain in the encoded name (act 420), then the decoded character is appended to L (act 428). Decoding module 172 then updates the pointer to point to the next bit after the decoded character (act 430), and then checks whether the leading eight bits pointed to by the pointer are all zeroes (act 414). If the leading eight bits pointed to by the pointer are not all zeroes, then module 172 returns to act 410. However, if the leading eight bits pointed to by the pointer are all zeroes, then module 172 decodes the next eight bits after the leading eight bits using another coding table (act 432) and returns to act 418. The coding table used in act 432 is the same as the coding table used in act 330 of FIG. 8 above.

Figure 11:
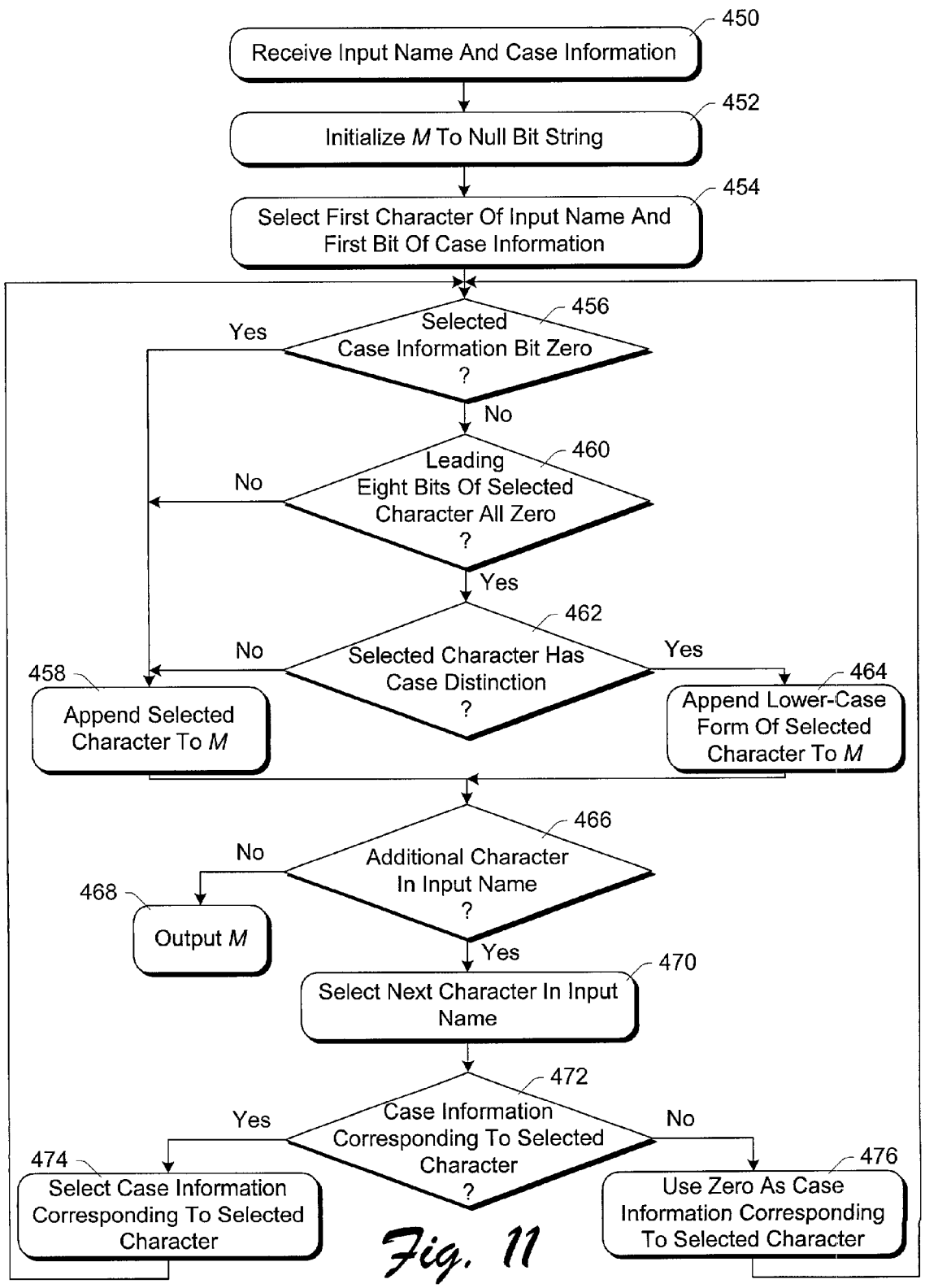
FIG. 11 is a flowchart illustrating an exemplary recasifying procedure in accordance with certain embodiments of the invention.

Upon completion of the decoding process, a decoded and decasified name remains, along with corresponding case information. Recasifying module (recasifier) 174 uses the decoded name and the corresponding case information to recasify the name. FIG. 11 is a flowchart illustrating an exemplary recasifying procedure in accordance with certain embodiments of the invention. Initially, recasifying module 174 receives an input name and corresponding case information (act 450). The input name and/or case information can be received from control module 160, or alternatively directly from decoding module 172.

Recasifying module 174 then initializes a decoded name string M to be a null bit string (act 452). Recasifying module 174 outputs string M as the recasified name upon completing the process of FIG. 11. Recasifying module 174 then selects the first character of the input name and the first bit of case information (act 454) and checks whether the selected case information bit is zero (act 456).

If the selected case information bit is zero, then the selected character is appended to string M (act 458). However, if the selected case information is not zero, then module 174 checks whether the leading eight bits of the selected character are all zeroes (act 460). If the leading eight bits of the selected character are not all zero, then the selected character is appended to string M (act 458); otherwise, module 174 checks whether the selected character has case distinction (act 462). If the selected character does not have case distinction then the selected character is appended to string M (act 458); otherwise, the lower-case form of the selected character is appended to string M (act 464).

After acts 458 and 464, module 174 checks whether any additional characters are in the input name (act 466). If there are no more characters in the input name then the value of string M is output as the recasified name (act 468). Any bits remaining in the case information are simply ignored. However, if there are additional characters in the input name, then module 174 selects the next character in the input name (act 470) and checks whether there is case information corresponding to the selected character (act 472). If there is case information corresponding to the selected character, then the corresponding case information is selected (act 474) and module 174 returns to act 456; otherwise, the value zero is used as the selected case information corresponding to the selected character (act 476) and module 174 returns to act 456.

Figure 12:
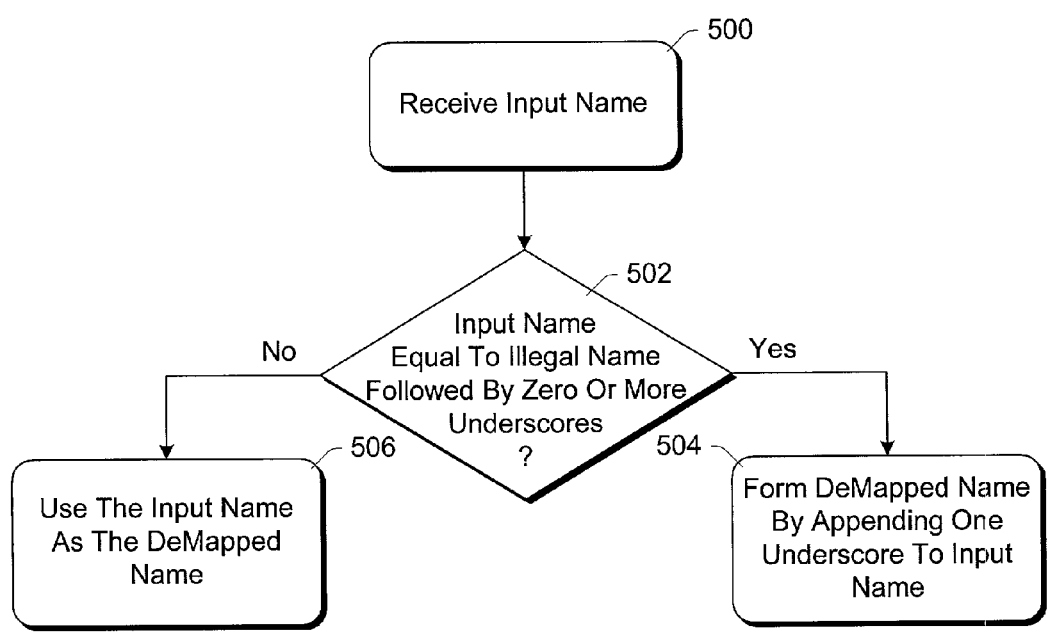
FIG. 12 is a flowchart illustrating an exemplary process for demapping a name in accordance with certain embodiments of the invention.

After recasifying module 174 recasifies the decode name, demapping module (demapper) 176 demaps the recasified name. FIG. 12 is a flowchart illustrating an exemplary process for demapping a name in accordance with certain embodiments of the invention. Initially, an input name is received by demapping module 176 (act 500). The input name can be received from control module 160, or alternatively directly from recasifying module 174 (or alternatively directly from decoding module 172 if the serverless distributed file system is case sensitive).

Demapping module 176 then checks whether the input name is equal to an illegal name followed by zero or more underscores (act 502). If the input name is equal to an illegal name followed by zero or more underscores, then the demapped name is formed by appending one underscore to the input name (act 504). However, if the input name is not equal to an illegal name followed by zero or more underscores, then the input name is used as the demapped name (act 506). Thus, if the input name is not equal to an illegal name followed by zero or more underscores, then the input name demaps to itself.

The system and process described above with reference to FIGS. 3–12 discusses generation and storage of modified names that reveal very little information about the original plaintext name (the approximate length of the original plaintext name and possibly some case information). In an alternate embodiment, the system and process described above are altered so that less information is revealed about the original plaintext name. These alterations are to the encoding/decoding, encryption/decryption, and validation processes as follows.

The decoding and encoding processes (discussed above with reference to FIGS. 8 and 10) and corresponding modules 166 and 172 of FIG. 3 are altered so that in act 320 of FIG. 8, only the trailing zero bits (if any) are removed (the one bit preceding the trailing zero bits is not removed). Then, during the decoding process of FIG. 10, the encoded name is extended by appending as many zero bits as necessary to complete the process described in FIG. 10.

Encryption module 168 of FIG. 3 is altered to the following encryption scheme. A fixed value W is established for the count of blocks in an encrypted name. This imposes some restrictions on the plaintext name (a plaintext name that would result in ciphertext having more than W blocks cannot be encrypted using this scheme). The encryption scheme can use any conventional block cipher encryption E (as discussed above) having a block size of Q bits. Encryption module 168 encrypts the encoded bit string according to the following three rules:

(1) if the encoded bit string B equals W×Q zero bits followed by a single one bit, then remove the trailing one bit from string B and encrypt the remaining bits of string B with block cipher E;

(2) if rule (1) does not apply and if the length of the encoded bit string B is greater than W×Q, then the procedure is aborted (the bit string is too long to be encrypted); and (3) if neither rule (1) nor (2) applies, then append as many zero bits as necessary to the end of encoded bit string B so that bit string B has a length of W×Q bits, and encrypt the bit string B with block cipher E.

Encryption module 168 is also altered to encrypt the case information I as follows. The case information I is extended to include as many bits as necessary to bring the total length of the case information string I up to a fixed value V. The value V can vary, and in one implementation is equal to the largest number of characters that can be in a valid name (optionally plus additional space for additional random padding). The case information I can be extended using any bit values (e.g., random values). The case information I is then encrypted with block cipher E (or alternatively a different block cipher).

Decryption module 170 is similarly modified so that the decryption is performed as follows. Decryption module 170 sets the encoded name B equal to the decryption $E^{-1}$ of the encrypted name. If the encoded name thus decrypted is all zero bits, then a one bit is appended to encoded name B. The encrypted case information is similarly decrypted using the decryption corresponding to the block cipher encryption used to encrypt the case information I.

The validation process (discussed above with reference to FIG. 9 and modules 350 and 352 of FIG. 3) is similarly altered to eliminate the checking of whether the first block of an encrypted name equals zero (block 372 of FIG. 9). The encryption process described here with a fixed block count W can result in valid encrypted names with a first block having a value of zero, so this checking is removed from the validation process.

The system and process described above with reference to FIGS. 3–12 allows multiple properties to be maintained (no two entries in a directory can be encryptions of identical names, all entries in the directory are encryptions of syntactically legal names, and the service that maintains the directory does not have access to the plaintext names of the entries). Alternative systems and processes may also be used that involve fewer acts and/or components, but do not necessarily maintain all of the properties discussed above. One such alternative is to simply encode a plaintext name using a fixed-bit-width encoding scheme, and then encrypt the encoded name using an encryption key. This alternative, however, can have problems when used with some encryption ciphers if the number of characters that are to be encoded is not a power of two (so there is no fixed bit width that can exactly encode all legal characters). Another such alternative also uses a fixed-bit-width encoding scheme, but with some characters encoded multiple times. This alternative, however, under circumstances cannot ensure that two directory entries are not the same.

Another such alternative is to encode each plaintext character using Huffman coding (or other prefix coding) and then encrypt the encoded name. However, due to variances in lengths of encoded names, it is not always possible to determine whether an encrypted name represents a legally complete encoded name. Another alternative that solves part of this problem is to discard any final partial character during decryption or to treat all missing bits as zeroes for the final character when running out of characters during decryption. However, both of these can also result in multiple directory entries that are the same.

FIG. 13 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and the like.

FIG. 13 shows a general example of a computer 542 that can be used in accordance with the invention. Computer 542 is shown as an example of a computer in which various embodiments of the invention can be practiced, and can be, for example, a computing device 150 of FIG. 3, one of a computing device 120–126 of FIG. 2, a computing device 102 or 104 of FIG. 1, etc. Computer 542 includes one or more processors or processing units 544, a system memory 546, and a bus 548 that couples various system components including the system memory 546 to processors 544.

The bus 548 represents one or more of any of several types of bus structures, including a memory bus or memory controller, a peripheral bus, an accelerated graphics port, and a processor or local bus using any of a variety of bus architectures. The system memory 546 includes read only memory (ROM) 550 and random access memory (RAM) 552. A basic input/output system (BIOS) 554, containing the basic routines that help to transfer information between elements within computer 542, such as during start-up, is stored in ROM 550. Computer 542 further includes a hard disk drive 556 for reading from and writing to a hard disk, not shown, connected to bus 548 via a hard disk drive interface 557 (e.g., a SCSI, ATA, or other type of interface); a magnetic disk drive 558 for reading from and writing to a removable magnetic disk 560, connected to bus 548 via a magnetic disk drive interface 561; and an optical disk drive 562 for reading from and/or writing to a removable optical disk 564 such as a CD ROM, DVD, or other optical media, connected to bus 548 via an optical drive interface 565. The drives and their associated computer-readable media provide nonvolatile storage of computer readable instructions, data structures, program modules and other data for computer 542. Although the exemplary environment described herein employs a hard disk, a removable magnetic disk 560, and a removable optical disk 564, it will be appreciated by those skilled in the art that other types of computer readable media which can store data that are accessible by a computer, such as magnetic cassettes, flash memory cards, random access memories (RAMs), read only memories (ROM), and the like, may also be used in the exemplary operating environment.

A number of program modules may be stored on the hard disk, magnetic disk 560, optical disk 564, ROM 550, or RAM 552, including an operating system 570, one or more application programs 572, other program modules 574, and program data 576. A user may enter commands and information into computer 542 through input devices such as keyboard 578 and pointing device 580. Other input devices (not shown) may include a microphone, joystick, game pad, satellite dish, scanner, or the like. These and other input devices are connected to the processing unit 544 through an interface 568 that is coupled to the system bus (e.g., a serial port interface, a parallel port interface, a universal serial bus (USB) interface, etc.). A monitor 584 or other type of display device is also connected to the system bus 548 via an interface, such as a video adapter 586. In addition to the monitor, personal computers typically include other peripheral output devices (not shown) such as speakers and printers.

Computer 542 operates in a networked environment using logical connections to one or more remote computers, such as a remote computer 588. The remote computer 588 may be another personal computer, a server, a router, a network PC, a peer device or other common network node, and typically includes many or all of the elements described above relative to computer 542, although only a memory storage device 590 has been illustrated in FIG. 13. The logical connections depicted in FIG. 13 include a local area network (LAN) 592 and a wide area network (WAN) 594. Such networking environments are commonplace in offices, enterprise-wide computer networks, intranets, and the Internet. In certain embodiments of the invention, computer 542 executes an Internet Web browser program (which may optionally be integrated into the operating system 570) such as the "Internet Explorer" Web browser manufactured and distributed by Microsoft Corporation of Redmond, Wash.

When used in a LAN networking environment, computer 542 is connected to the local network 592 through a network interface or adapter 596. When used in a WAN networking environment, computer 542 typically includes a modem 598 or other means for establishing communications over the wide area network 594, such as the Internet. The modem 598, which may be internal or external, is connected to the system bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Computer 542 also includes a broadcast tuner 600. Broadcast tuner 600 receives broadcast signals either directly (e.g., analog or digital cable transmissions fed directly into tuner 600) or via a reception device (e.g., via antenna or satellite dish).

Computer 542 typically includes at least some form of computer readable media. Computer readable media can be any available media that can be accessed by computer 542. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory, or other memory technology; CD-ROM, digital versatile disks (DVD), or other optical storage; magnetic cassettes, magnetic tape, magnetic disk storage, or other magnetic storage devices; or any other media which can be used to store the desired information and which can be accessed by computer 542. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared, and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method comprising:
   receiving an identifier;
   generating, based on the identifier, a mapped identifier;
   encoding the mapped identifier, wherein encoding the mapped identifier comprises:
      reversing an order of characters in the mapped identifier;
      removing, from the reversed mapped identifier, all trailing characters of a particular type;
      initializing an identifier string with a string of one bits equal in number to a number of trailing characters removed from the reversed mapped identifier followed by a zero bit;
      selecting a first character from the reversed mapped identifier;
      encoding the first character using a first coding table;
      modifying the identifier string by adding, to the identifier string, a series of zero bits followed by the encoded first character;
      for each additional character in the reversed mapped identifier,
         selecting a next character in the reversed mapped identifier,
         encoding the next character using a second coding table,
         modifying the previously modified identifier string by adding, to the previously modified identifier string, a series of zero bits followed by the encoded next character; and
      removing any trailing zero bits and the one bit preceding the trailing zero bits from the identifier string, wherein upon completing removing any trailing zero bits and the one bit the identifier string is the encoded mapped identifier; and
   encrypting the encoded mapped identifier.

2. A method as recited in claim 1, wherein the identifier comprises one of: a file name, a folder name, and a directory name.

3. A method as recited in claim 1, further comprising:
   generating, based on the mapped identifier, a decasified identifier and corresponding case information;
   wherein the encoding comprises encoding the decasified identifier; and
   wherein the encrypting comprises encrypting both the encoded decasified identifier and the case information.

4. A method as recited in claim 3, wherein generating the decasified identifier and corresponding case information comprises:
   for each character that has both an upper-case and a lower-case form, storing the character in upper-case form and recording in the case information whether the character was in upper-case form or lower-case form.

5. A method as recited in claim 4, further comprising:
storing the character in upper-case form only if the character is one of a particular set of characters; and
storing the character without altering its case if the character is not one of the particular set of characters.

6. A method as recited in claim 5, wherein the particular set of characters comprises the extended ASCII character set.

7. A method as recited in claim 1, wherein the generating comprises generating the mapped identifier only if the received identifier is syntactically legal.

8. A method as recited in claim 1, wherein the encoding comprises encoding the mapped identifier only if the received identifier is syntactically legal.

9. A method as recited in claim 1, wherein generating the mapped identifier comprises:
checking whether the identifier is equal to one of a plurality of illegal identifiers;
if the identifier is not equal to one of the plurality of illegal identifiers, then checking whether the identifier is equal to one of the plurality of illegal identifiers followed by one or more particular characters;
if the identifier is not equal to one of the plurality of illegal identifiers followed by one or more particular characters, then using the identifier as the mapped identifier; and
if the identifier is equal to one of the plurality of illegal identifiers followed by one or more particular characters, then using as the mapped identifier the identifier with one of the particular characters removed.

10. A method as recited in claim 9, wherein the particular character comprises an underscore.

11. A method as recited in claim 1, wherein the characters of a particular type are the characters that are coded to zero using the first coding table.

12. A method as recited in claim 1, wherein the first coding table and the second coding table are Huffman coding tables.

13. A method as recited in claim 1, wherein each coding in the first coding table is the same as a corresponding coding in the second coding table, but the second coding table codes additional characters not coded by the first coding table.

14. A method as recited in claim 1, wherein for the each additional character in the reversed mapped identifier, encoding the character only if a set of leading bits of the character are zero, and further comprising modifying the previously modified identifier string by adding the character to the previously modified identifier string if the set of leading bits of the character are not zero.

15. A method as recited in claim 1, wherein encrypting the encoded mapped identifier comprises using a block cipher to encrypt the encoded identifier.

16. A method as recited in claim 1, wherein encrypting the encoded mapped identifier comprises using cipher block chaining to encrypt the encoded identifier.

17. A method as recited in claim 1, wherein the encrypting comprises encrypting the encoded mapped identifier to generate, using a block cipher, a ciphertext having a fixed size.

18. A computer-implemented method comprising:
receiving an identifier;
generating, based on the identifier, a mapped identifier;
encoding the mapped identifier, wherein encoding the mapped identifier comprises:
reversing an order of characters in the mapped identifier;
removing, from the reversed mapped identifier, all trailing characters of a particular type;
initializing an identifier string with a string of one bits equal in number to a number of trailing characters removed from the reversed mapped identifier followed by a zero bit;
selecting a first character from the reversed mapped identifier;
encoding the first character using a first coding table;
modifying the identifier string by adding, to the identifier string, a series of zero bits followed by the encoded first character;
for each additional character in the reversed mapped identifier,
selecting a next character in the reversed mapped identifier,
encoding the next character using one of a plurality of additional coding tables,
modifying the previously modified identifier string by adding, to the previously modified identifier string, a series of zero bits followed by the encoded next character; and
removing any trailing zero bits and the one bit preceding the trailing zero bits from the identifier string, wherein upon completing removing any trailing zero bits and the one bit the identifier string is the encoded mapped identifier; and
encrypting the encoded mapped identifier.

19. One or more computer-readable media having stored thereon a plurality of instructions that, when executed by one or more processors of a computer, causes the one or more processors to perform acts including:
receiving a plaintext identifier;
generating a ciphertext by encrypting the plaintext identifier only if the plaintext identifier is syntactically legal, wherein generating the ciphertext comprises:
generating, based on the plaintext identifier, a mapped identifier;
encoding the mapped identifier, wherein encoding the mapped identifier comprises:
reversing an order of characters in the mapped identifier;
removing, from the reversed mapped identifier, all trailing characters of a particular type;
initializing an identifier string with a string of one bits equal in number to a number of trailing characters removed from the reversed mapped identifier followed by a zero bit;
selecting a first character from the reversed mapped identifier;
encoding the first character using a first coding table;
modifying the identifier string by adding, to the identifier string, a series of zero bits followed by the encoded first character;
for each additional character in the reversed mapped identifier,
selecting a next character in the reversed mapped identifier,
encoding the next character using a second coding table,
modifying the previously modified identifier string by adding, to the previously modified identifier string, a series of zero bits followed by the encoded next character; and
removing any trailing zero bits and the one bit preceding the trailing zero bits from the identifier string, wherein upon completing removing any trailing zero bits and the one bit the identifier string is the encoded mapped identifier; and encrypting the encoded mapped identifier; and wherein the encrypting allows another device to verify, without decrypting the ciphertext, that the plaintext identifier is not identical to another plaintext identifier maintained by the other device.

20. One or more computer-readable media as recited in claim 19, wherein generating the ciphertext further comprises:

generating, based on the mapped identifier, a decasified identifier and corresponding case information;

wherein the encoding comprises encoding the decasified identifier; and wherein the encrypting comprises encrypting both the encoded decasified identifier and the case information.

21. One or more computer-readable media as recited in claim 19, wherein generating the mapped identifier comprises:

checking whether the plaintext identifier is equal to one of a plurality of illegal identifiers if the plaintext identifier is not equal to one of the plurality of illegal identifiers, then checking whether the plaintext identifier is equal to one of the plurality of illegal identifiers followed by one or more particular characters;

if the plaintext identifier is not equal to one of the plurality of illegal identifiers followed by one or more particular characters, then using the plaintext identifier as the mapped identifier; and if the plaintext identifier is equal to one of the plurality of illegal identifiers followed by one or more particular characters, then using as the mapped identifier the plaintext identifier with one of the particular characters removed.

22. One or more computer-readable media as recited in claim 19, wherein each coding in the first coding table is the same as a corresponding coding in the second coding table, but the second coding table codes additional characters not coded by the first coding table.

23. One or more computer-readable media as recited in claim 19, wherein encrypting the encoded mapped identifier comprises using a block cipher to encrypted the encoded identifier.

24. One or more computer-readable media having stored thereon a plurality of instructions that, when executed by one or more processors of a computer, causes the one or more processors to perform acts including:

receiving a plaintext identifier;

generating a ciphertext by encrypting the plaintext identifier only if the plaintext identifier is syntactically legal, wherein generating the ciphertext comprises:

generating, based on the plaintext identifier, a mapped identifier;

encoding the mapped identifier, wherein encoding the mapped identifier comprises:

reversing an order of characters in the mapped identifier;

removing, from the reversed mapped identifier, all trailing characters of a particular type;

initializing an identifier string with a string of one bits equal in number to a number of trailing characters removed from the reversed mapped identifier followed by a zero bit;

selecting a first character from the reversed mapped identifier;

encoding the first character using a first coding table;

modifying the identifier string by adding, to the identifier string, a series of zero bits followed by the encoded first character;

for each additional character in the reversed mapped identifier, selecting a next character in the reversed mapped identifier, encoding the next character using one of a plurality of additional coding tables, modifying the previously modified identifier string by adding, to the previously modified identifier string, a series of zero bits followed by the encoded next character; and removing any trailing zero bits and the one bit preceding the trailing zero bits from the identifier string, wherein upon completing removing any trailing zero bits and the one bit the identifier string is the encoded mapped identifier; and encrypting the encoded mapped identifier; and wherein the encrypting allows another device to verify, without decrypting the ciphertext, that the plaintext identifier is not identical to another plaintext identifier maintained by the other device.

25. One or more computer-readable media having stored thereon a plurality of instructions that, when executed by one or more processors of a computer, causes the one or more processors to perform acts including:

receiving a plaintext directory entry;

verifying that the plaintext directory entry is syntactically legal;

encrypting the plaintext directory entry only if the plaintext directory entry is syntactically legal, wherein encrypting the plaintext directory entry comprises:

generating, based on the plaintext directory entry, a mapped identifier;

encoding the mapped identifier, wherein encoding the mapped identifier comprises:

reversing an order of characters in the mapped identifier;

removing, from the reversed mapped identifier, all trailing characters of a particular type;

initializing an identifier string with a string of one bits equal in number to a number of trailing characters removed from the reversed mapped identifier followed by a zero bit;

selecting a first character from the reversed mapped identifier;

encoding the first character using a first coding table;

modifying the identifier string by adding, to the identifier string, a series of zero bits followed by the encoded first character;

for each additional character in the reversed mapped identifier, selecting a next character in the reversed mapped identifier, encoding the next character using a second coding table, modifying the previously modified identifier string by adding, to the previously modified identifier string, a series of zero bits followed by the encoded next character; and removing any trailing zero bits and the one bit preceding the trailing zero bits from the identifier string, wherein upon completing removing any trailing zero bits and the one bit the identifier string is the encoded mapped identifier; and encrypting the encoded mapped identifier;

communicating the encrypted directory entry to another device; and wherein the encrypting allows the other device to verify, without decrypting the encrypted directory entry, that the directory entry is not identical to any other directory entry maintained by the other device.

26. One or more computer-readable media as recited in claim 25, wherein the computer is part of a serverless distributed file system.

27. One or more computer-readable media as recited in claim 25, wherein the plaintext directory entry comprises a file name.

28. One or more computer-readable media as recited in claim 25, wherein the plaintext directory entry comprises a directory name.

29. One or more computer-readable media as recited in claim 25, wherein the plaintext directory entry comprises a folder name.

30. One or more computer-readable media as recited in claim 25, wherein encrypting the plaintext directory entry further comprises:

generating, based on the mapped identifier, a decasified identifier and corresponding case information;

wherein the encoding comprises encoding the decasified identifier; and wherein the encrypting comprises encrypting both the encoded decasified identifier and the case information.

31. One or more computer-readable media as recited in claim 25, wherein generating the mapped identifier comprises generating the mapped identifier only if the received plaintext directory entry is syntactically legal.

32. One or more computer-readable media as recited in claim 25, wherein the encoding comprises encoding the mapped identifier only if the received plaintext directory entry is syntactically legal.

33. One or more computer-readable media as recited in claim 25, wherein generating the mapped identifier comprises:

checking whether the plaintext directory entry is equal to one of a plurality of illegal identifiers;

if the plaintext directory entry is not equal to one of the plurality of illegal identifiers, then checking whether the plaintext directory entry is equal to one of the plurality of illegal identifiers followed by one or more particular characters;

if the plaintext directory entry is not equal to one of the plurality of illegal identifiers followed by one or more particular characters, then using the plaintext directory entry as the mapped identifier; and if the plaintext directory entry is equal to one of the plurality of illegal identifiers followed by one or more particular characters, then using as the mapped identifier the plaintext directory entry with one of the particular characters removed.

34. One or more computer-readable media as recited in claim 33, wherein the particular character comprises an underscore.

35. One or more computer-readable media as recited in claim 25, wherein each coding in the first coding table is the same as a corresponding coding in the second coding table, but the second coding table codes additional characters not coded by the first coding table.

36. One or more computer-readable media as recited in claim 25, wherein the characters of a particular type are the characters that are coded to zero using the first coding table.

37. One or more computer-readable media as recited in claim 25, wherein the first coding table and the second coding table are Huffman coding tables.

38. One or more computer-readable media as recited in claim 25, wherein each coding in the first coding table is the same as a corresponding coding in the second coding table, but the second coding table codes additional characters not coded by the first coding table.

39. One or more computer-readable media as recited in claim 25, wherein for each additional character in the reversed mapped identifier, encoding the character only if a set of leading bits of the character are zero, and further comprising modifying the previously modified identifier string by adding the character to the previously modified identifier string if the set of leading bits of the character are not zero.

40. One or more computer-readable media as recited in claim 25, wherein encrypting the encoded mapped identifier comprises using a block cipher to encrypt the encoded identifier.

41. One or more computer-readable media as recited in claim 25, wherein the encrypting further comprises generating, using a block cipher, the encrypted directory entry having a fixed size.

* * * * *